(12) United States Patent
Walker et al.

(10) Patent No.: US 7,912,758 B2
(45) Date of Patent: *Mar. 22, 2011

(54) METHOD AND APPARATUS FOR PRODUCT DISPLAY

(75) Inventors: Jay S. Walker, Ridgefield, CT (US); Andrew S. Van Luchene, New York, NY (US); Magdalena M. Fincham, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 459 days.

This patent is subject to a terminal disclaimer.

(21) Appl. No.: 11/937,743

(22) Filed: Nov. 9, 2007

(65) Prior Publication Data

US 2008/0059337 A1    Mar. 6, 2008

Related U.S. Application Data

(63) Continuation of application No. 10/100,563, filed on Mar. 15, 2002, now Pat. No. 7,340,419.

(60) Provisional application No. 60/276,193, filed on Mar. 15, 2001.

(51) Int. Cl.
*G06Q 30/00* (2006.01)
(52) U.S. Cl. .................. 705/26; 705/27; 705/22
(58) Field of Classification Search .................. None
See application file for complete search history.

(56) References Cited

U.S. PATENT DOCUMENTS

| | | | |
|---|---|---|---|
| 2,607,463 A | 8/1952 | Saigh, Jr. | |
| 3,442,422 A | 5/1969 | Neidig | |
| 3,573,747 A | 4/1971 | Adams et al. | |
| 3,691,527 A | 9/1972 | Yamamoto | |
| 3,705,384 A | 12/1972 | Wahlberg | |
| 3,747,733 A | 7/1973 | Knickerbocker | |
| 3,937,929 A | 2/1976 | Knauer | |
| RE29,450 E | 10/1977 | Goldsby et al. | |
| 4,108,361 A | 8/1978 | Krause | |
| 4,237,537 A | 12/1980 | Pitches et al. | |
| 4,245,730 A | 1/1981 | Bachmann et al. | |
| 4,258,837 A | 3/1981 | Manos et al. | |
| 4,282,575 A | 8/1981 | Hoskinson et al. | |
| 4,316,532 A | 2/1982 | Levasseur | |
| 4,323,770 A | 4/1982 | Dieulot et al. | |

(Continued)

FOREIGN PATENT DOCUMENTS

CA    2070736 A1    6/1992

(Continued)

OTHER PUBLICATIONS

"PriceWatch", (http://icon.co.za/-robo/prod01.htm); download date: Jun. 9, 1998. 5 pp.

(Continued)

*Primary Examiner* — F. Zeender
*Assistant Examiner* — Christopher Buchanan
(74) *Attorney, Agent, or Firm* — Fincham Downs, LLC

(57) ABSTRACT

Systems and methods are provided for receiving a request to display at least one product. A substitute product for the at least one product is selected from a plurality of substitute products. The selection may be based on, for example, expected revenue from display of the selected substitute product, expected revenue for purchase of the selected substitute product, or a substitution success rate. The selected substitute product is then displayed.

16 Claims, 9 Drawing Sheets

U.S. PATENT DOCUMENTS

| | | |
|---|---|---|
| 4,341,951 A | 7/1982 | Benton |
| 4,359,147 A | 11/1982 | Levasseur |
| 4,376,479 A | 3/1983 | Sugimoto et al. |
| 4,420,751 A | 12/1983 | Paganini et al. |
| 4,478,353 A | 10/1984 | Levasseur |
| 4,498,570 A | 2/1985 | King et al. |
| 4,554,446 A | 11/1985 | Murphy et al. |
| 4,567,609 A | 1/1986 | Metcalf |
| 4,574,947 A | 3/1986 | Hutchings |
| RE32,115 E | 4/1986 | Lockwood et al. |
| 4,598,378 A | 7/1986 | Giacomo |
| 4,603,390 A | 7/1986 | Mehdipour et al. |
| 4,639,875 A | 1/1987 | Abraham et al. |
| 4,669,730 A | 6/1987 | Small |
| 4,677,553 A | 6/1987 | Roberts et al. |
| 4,679,150 A | 7/1987 | Hayashi et al. |
| 4,689,742 A | 8/1987 | Troy et al. |
| 4,723,212 A | 2/1988 | Mindrum et al. |
| 4,734,858 A | 3/1988 | Schlafly |
| 4,736,096 A | 4/1988 | Ushikubo |
| 4,737,910 A | 4/1988 | Kimbrow |
| 4,743,022 A | 5/1988 | Wood |
| 4,760,247 A | 7/1988 | Keane et al. |
| 4,766,548 A | 8/1988 | Cedrone et al. |
| 4,799,156 A | 1/1989 | Shavit et al. |
| 4,815,741 A | 3/1989 | Small |
| 4,817,166 A | 3/1989 | Gonzalez et al. |
| 4,817,990 A | 4/1989 | Krost |
| 4,825,045 A | 4/1989 | Humble |
| 4,833,607 A | 5/1989 | Dethloff et al. |
| 4,834,231 A | 5/1989 | Awane et al. |
| 4,839,507 A | 6/1989 | May |
| 4,854,590 A | 8/1989 | Jolliff et al. |
| 4,857,840 A | 8/1989 | Lanchais |
| 4,859,838 A | 8/1989 | Okiharu |
| 4,878,248 A | 10/1989 | Shyu et al. |
| 4,882,473 A | 11/1989 | Bergeron et al. |
| 4,882,675 A | 11/1989 | Nichtberger et al. |
| 4,899,906 A | 2/1990 | Bella |
| 4,906,828 A | 3/1990 | Halpern |
| 4,908,761 A | 3/1990 | Tai |
| 4,910,672 A | 3/1990 | Off et al. |
| 4,922,435 A | 5/1990 | Cahlander et al. |
| 4,922,522 A | 5/1990 | Scanlon |
| 4,937,853 A | 6/1990 | Brule et al. |
| 4,947,028 A | 8/1990 | Gorog |
| 4,963,723 A | 10/1990 | Masada |
| 4,973,952 A | 11/1990 | Malec et al. |
| 4,982,337 A | 1/1991 | Burr et al. |
| 4,982,346 A | 1/1991 | Girouard |
| 4,992,940 A | 2/1991 | Dworkin |
| 4,993,714 A | 2/1991 | Golightly |
| 4,999,763 A | 3/1991 | Ousborne |
| 5,010,485 A | 4/1991 | Bigari |
| 5,025,372 A | 6/1991 | Burton et al. |
| 5,029,098 A | 7/1991 | Levasseur |
| 5,034,739 A | 7/1991 | Gruhl |
| 5,039,848 A | 8/1991 | Stoken |
| 5,056,019 A | 10/1991 | Schultz et al. |
| 5,058,044 A | 10/1991 | Stewart et al. |
| 5,064,999 A | 11/1991 | Okamoto et al. |
| 5,081,685 A | 1/1992 | Jones, III et al. |
| 5,091,713 A | 2/1992 | Horne et al. |
| 5,117,354 A | 5/1992 | Long et al. |
| 5,117,407 A | 5/1992 | Vogel |
| 5,119,295 A | 6/1992 | Kapur |
| 5,128,862 A | 7/1992 | Mueller |
| 5,132,914 A | 7/1992 | Cahlander et al. |
| 5,136,658 A | 8/1992 | Mori |
| 5,172,328 A | 12/1992 | Cahlander et al. |
| 5,173,851 A | 12/1992 | Off et al. |
| 5,176,224 A | 1/1993 | Spector |
| 5,177,342 A | 1/1993 | Adams |
| 5,185,695 A | 2/1993 | Pruchnicki |
| 5,189,607 A | 2/1993 | Shirasaki et al. |
| 5,191,410 A | 3/1993 | McCalley et al. |
| 5,192,854 A | 3/1993 | Counts |
| 5,193,648 A | 3/1993 | Yuter |
| 5,201,010 A | 4/1993 | Deaton et al. |
| 5,202,826 A | 4/1993 | McCarthy |
| 5,204,675 A | 4/1993 | Sekine |
| 5,216,595 A | 6/1993 | Protheroe |
| 5,223,698 A | 6/1993 | Kapur |
| 5,231,569 A | 7/1993 | Myatt et al. |
| 5,239,165 A | 8/1993 | Novak |
| 5,243,515 A | 9/1993 | Lee |
| 5,245,533 A | 9/1993 | Marshall |
| 5,253,165 A | 10/1993 | Leiseca et al. |
| 5,256,863 A | 10/1993 | Fergusen et al. |
| 5,257,179 A | 10/1993 | DeMar |
| 5,262,941 A | 11/1993 | Saladin et al. |
| 5,267,452 A | 12/1993 | Zinsmeyer et al. |
| 5,274,547 A | 12/1993 | Zoffel et al. |
| 5,283,731 A | 2/1994 | Lalonde et al. |
| 5,297,031 A | 3/1994 | Gutterman et al. |
| 5,302,811 A | 4/1994 | Fukatsu |
| 5,305,195 A | 4/1994 | Murphy |
| 5,315,093 A | 5/1994 | Stewart |
| 5,315,664 A | 5/1994 | Kumagai |
| 5,319,542 A | 6/1994 | King, Jr. et al. |
| 5,325,291 A | 6/1994 | Garrett et al. |
| 5,339,250 A | 8/1994 | Durbin |
| 5,353,218 A | 10/1994 | De Lapa et al. |
| 5,367,452 A | 11/1994 | Gallery et al. |
| 5,368,129 A | 11/1994 | Von Kohorn |
| 5,380,991 A | 1/1995 | Valencia et al. |
| 5,381,155 A | 1/1995 | Gerber |
| 5,383,111 A | 1/1995 | Homma et al. |
| RE34,915 E | 4/1995 | Nichtberger et al. |
| 5,408,417 A | 4/1995 | Wilder |
| 5,420,606 A | 5/1995 | Begum et al. |
| 5,422,473 A | 6/1995 | Kamata |
| 5,425,108 A | 6/1995 | Hwang et al. |
| 5,434,394 A | 7/1995 | Roach et al. |
| 5,450,938 A | 9/1995 | Rademacher |
| 5,452,344 A | 9/1995 | Larson |
| 5,459,306 A | 10/1995 | Stein et al. |
| 5,481,094 A | 1/1996 | Suda |
| 5,482,139 A | 1/1996 | Rivalto |
| 5,495,412 A | 2/1996 | Thiessen |
| 5,504,475 A | 4/1996 | Houdou et al. |
| 5,504,675 A | 4/1996 | Cragun et al. |
| 5,510,979 A | 4/1996 | Moderi et al. |
| 5,511,646 A | 4/1996 | Maldanis et al. |
| 5,513,117 A | 4/1996 | Small |
| 5,515,268 A | 5/1996 | Yoda |
| 5,521,364 A | 5/1996 | Kimura et al. |
| 5,526,257 A | 6/1996 | Lerner |
| 5,536,045 A | 7/1996 | Adams |
| 5,537,314 A | 7/1996 | Kanter |
| 5,544,040 A | 8/1996 | Gerbaulet |
| 5,544,784 A | 8/1996 | Malaspina |
| 5,546,316 A | 8/1996 | Buckley et al. |
| 5,550,746 A | 8/1996 | Jacobs |
| 5,557,721 A | 9/1996 | Fite et al. |
| 5,568,406 A | 10/1996 | Gerber |
| 5,572,653 A | 11/1996 | DeTemple et al. |
| 5,581,064 A | 12/1996 | Riley et al. |
| 5,590,197 A | 12/1996 | Chen et al. |
| 5,591,972 A | 1/1997 | Noble et al. |
| 5,592,375 A | 1/1997 | Salmon et al. |
| 5,592,376 A | 1/1997 | Hodroff |
| 5,592,378 A | 1/1997 | Cameron et al. |
| 5,596,501 A | 1/1997 | Comer et al. |
| 5,602,377 A | 2/1997 | Beller et al. |
| 5,604,901 A | 2/1997 | Kelley et al. |
| 5,608,643 A | 3/1997 | Wichter et al. |
| 5,611,051 A | 3/1997 | Pirelli |
| 5,611,052 A | 3/1997 | Dykstra et al. |
| 5,612,527 A | 3/1997 | Ovadia |
| 5,612,868 A | 3/1997 | Off et al. |
| 5,613,620 A | 3/1997 | Center et al. |
| 5,615,269 A | 3/1997 | Micali |
| 5,620,079 A | 4/1997 | Molbak |
| 5,621,201 A | 4/1997 | Langhans et al. |
| 5,621,640 A | 4/1997 | Burke |
| 5,621,812 A | 4/1997 | Deaton et al. |

| | | | | | | |
|---|---|---|---|---|---|---|
| 5,630,357 A | 5/1997 | Akiyama | | 5,930,145 A | 7/1999 | Yuyama et al. |
| 5,631,724 A | 5/1997 | Sawada et al. | | 5,930,771 A | 7/1999 | Stapp |
| 5,632,010 A | 5/1997 | Briechle et al. | | 5,937,391 A | 8/1999 | Ikeda et al. |
| 5,637,859 A | 6/1997 | Menoud | | 5,938,717 A | 8/1999 | Dunne et al. |
| 5,638,302 A | 6/1997 | Gerber | | 5,948,038 A | 9/1999 | Daly et al. |
| 5,642,484 A | 6/1997 | Harrison, III et al. | | 5,956,695 A | 9/1999 | Carrithers et al. |
| 5,649,114 A | 7/1997 | Deaton et al. | | 5,959,869 A | 9/1999 | Miller et al. |
| 5,651,075 A | 7/1997 | Frazier et al. | | 5,963,452 A | 10/1999 | Etoh et al. |
| 5,655,007 A | 8/1997 | McAllister | | 5,963,939 A | 10/1999 | McCann et al. |
| 5,666,493 A | 9/1997 | Wojcik et al. | | 5,970,469 A | 10/1999 | Scroggie et al. |
| 5,675,662 A | 10/1997 | Deaton et al. | | 5,974,399 A | 10/1999 | Giuliani et al. |
| 5,685,435 A | 11/1997 | Picioccio et al. | | 5,988,346 A | 11/1999 | Tedesco et al. |
| 5,687,087 A | 11/1997 | Taggart | | 5,991,740 A | 11/1999 | Messer |
| 5,687,322 A | 11/1997 | Deaton et al. | | 5,995,942 A | 11/1999 | Smith et al. |
| 5,692,132 A | 11/1997 | Hogan | | 5,997,928 A | 12/1999 | Kaish et al. |
| 5,701,252 A | 12/1997 | Facchin et al. | | 5,999,914 A | 12/1999 | Blinn et al. |
| 5,708,782 A | 1/1998 | Larson et al. | | 6,012,834 A | 1/2000 | Dueck et al. |
| 5,710,557 A | 1/1998 | Schuette | | 6,014,634 A | 1/2000 | Scroggie et al. |
| 5,710,886 A | 1/1998 | Christiansen et al. | | 6,016,504 A | 1/2000 | Arnold et al. |
| 5,710,887 A | 1/1998 | Chelliah et al. | | 6,017,157 A | 1/2000 | Garfinkle |
| 5,713,795 A | 2/1998 | Kohorn | | 6,021,394 A | 2/2000 | Takahashi |
| 5,717,866 A | 2/1998 | Naftger | | 6,026,370 A | 2/2000 | Jermyn |
| 5,719,396 A | 2/1998 | Jack et al. | | 6,026,375 A | 2/2000 | Hall et al. |
| 5,726,450 A | 3/1998 | Peterson et al. | | 6,029,139 A | 2/2000 | Cunningham et al. |
| 5,727,163 A | 3/1998 | Bezos | | 6,029,141 A | 2/2000 | Bezos et al. |
| 5,727,164 A | 3/1998 | Kaye et al. | | 6,035,284 A | 3/2000 | Straub et al. |
| 5,732,398 A | 3/1998 | Tagawa | | 6,038,551 A | 3/2000 | Barlow et al. |
| 5,732,950 A | 3/1998 | Moody | | 6,048,267 A | 4/2000 | Wichinsky |
| 5,734,150 A | 3/1998 | Brown et al. | | 6,049,777 A | 4/2000 | Sheena et al. |
| 5,734,838 A | 3/1998 | Robinson et al. | | 6,049,780 A * | 4/2000 | Fuyama .................... 705/15 |
| 5,737,710 A | 4/1998 | Anthonyson | | 6,050,568 A | 4/2000 | Hachquet |
| 5,739,512 A | 4/1998 | Tognazzini | | 6,052,667 A | 4/2000 | Walker et al. |
| 5,754,653 A | 5/1998 | Canfield | | 6,055,513 A | 4/2000 | Katz |
| 5,758,328 A | 5/1998 | Giovannoli | | 6,058,373 A | 5/2000 | Blinn et al. |
| 5,761,648 A | 6/1998 | Golden et al. | | 6,058,375 A | 5/2000 | Park |
| 5,768,142 A | 6/1998 | Jacobs | | 6,061,660 A | 5/2000 | Eggleston et al. |
| 5,769,269 A | 6/1998 | Peters | | 6,073,840 A | 6/2000 | Marion |
| 5,774,868 A | 6/1998 | Cragun et al. | | 6,076,070 A | 6/2000 | Stack |
| 5,774,870 A | 6/1998 | Storey | | 6,078,866 A | 6/2000 | Buck et al. |
| 5,774,874 A | 6/1998 | Veeneman et al. | | 6,085,168 A | 7/2000 | Mori et al. |
| 5,780,133 A | 7/1998 | Engstrom | | 6,101,485 A | 8/2000 | Fortenberry et al. |
| 5,791,991 A | 8/1998 | Small | | 6,115,649 A | 9/2000 | Sakata |
| 5,794,207 A | 8/1998 | Walker et al. | | 6,119,099 A | 9/2000 | Walker et al. |
| 5,799,284 A | 8/1998 | Bourquin | | 6,131,085 A | 10/2000 | Rossides |
| 5,802,015 A | 9/1998 | Rothschild et al. | | 6,134,534 A | 10/2000 | Walker et al. |
| 5,806,044 A | 9/1998 | Powell | | 6,167,382 A | 12/2000 | Sparks et al. |
| 5,809,144 A | 9/1998 | Sirbu et al. | | 6,192,349 B1 | 2/2001 | Husemann et al. |
| 5,816,918 A | 10/1998 | Kelley et al. | | 6,193,154 B1 | 2/2001 | Phillips et al. |
| 5,822,216 A | 10/1998 | Satchell, Jr. et al. | | 6,193,155 B1 | 2/2001 | Walker et al. |
| 5,822,736 A | 10/1998 | Hartman et al. | | 6,199,014 B1 | 3/2001 | Walker et al. |
| 5,832,457 A | 11/1998 | O'Brien et al. | | 6,205,435 B1 | 3/2001 | Biffar |
| 5,832,458 A | 11/1998 | Jones | | 6,223,163 B1 | 4/2001 | Van Luchene |
| 5,842,178 A | 11/1998 | Giovannoli | | 6,236,971 B1 | 5/2001 | Stefik et al. |
| 5,842,212 A | 11/1998 | Ballurio et al. | | 6,247,047 B1 | 6/2001 | Wolff |
| 5,844,808 A | 12/1998 | Konsmo et al. | | 6,249,772 B1 | 6/2001 | Walker et al. |
| 5,845,259 A | 12/1998 | West et al. | | 6,260,024 B1 | 7/2001 | Shkedy |
| 5,845,265 A | 12/1998 | Woolston | | 6,266,651 B1 | 7/2001 | Woolston |
| 5,848,399 A | 12/1998 | Burke | | 6,321,984 B1 | 11/2001 | McCall et al. |
| 5,850,446 A | 12/1998 | Berger et al. | | 6,324,520 B1 | 11/2001 | Walker et al. |
| 5,855,007 A | 12/1998 | Jovicic et al. | | 6,330,544 B1 | 12/2001 | Walker et al. |
| 5,857,175 A | 1/1999 | Day et al. | | 6,370,513 B1 | 4/2002 | Kolawa et al. |
| 5,864,604 A | 1/1999 | Moen et al. | | 6,405,174 B1 | 6/2002 | Walker et al. |
| 5,864,822 A | 1/1999 | Baker, III | | 6,467,686 B1 | 10/2002 | Guthrie et al. |
| 5,870,716 A | 2/1999 | Sugiyama et al. | | 6,505,171 B1 * | 1/2003 | Cohen et al. .................... 705/26 |
| 5,870,717 A | 2/1999 | Wiecha | | 6,512,570 B2 | 1/2003 | Garfinkle et al. |
| 5,870,719 A | 2/1999 | Maritzen et al. | | 6,519,584 B1 * | 2/2003 | Tognazzini et al. ............ 715/769 |
| 5,873,069 A | 2/1999 | Reuhl et al. | | 0,088,465 A1 | 5/2003 | Monteverde |
| 5,875,110 A | 2/1999 | Jacobs | | 6,584,448 B1 | 6/2003 | Laor |
| 5,878,139 A | 3/1999 | Rosen | | 6,684,195 B1 | 1/2004 | Deaton et al. |
| 5,878,401 A * | 3/1999 | Joseph ..................... 705/22 | | 6,873,958 B2 * | 3/2005 | Artinger ..................... 705/4 |
| 5,883,810 A | 3/1999 | Franklin et al. | | 6,970,837 B1 * | 11/2005 | Walker et al. .................... 705/26 |
| 5,887,271 A | 3/1999 | Powell | | 7,340,419 B2 * | 3/2008 | Walker et al. .................... 705/27 |
| 5,890,136 A | 3/1999 | Kipp | | 7,340,760 B2 * | 3/2008 | Wachtfogel et al. ............ 725/34 |
| 5,905,246 A | 5/1999 | Fajkowski | | 7,519,273 B2 * | 4/2009 | Lowthert et al. ............... 386/95 |
| 5,907,830 A | 5/1999 | Engel et al. | | 2002/0120496 A1 | 8/2002 | Scroggie et al. |
| 5,918,213 A | 6/1999 | Bernard et al. | | 2003/0033292 A1 | 2/2003 | Meisel et al. |
| 5,924,078 A | 7/1999 | Naftzger | | 2003/0041098 A1 * | 2/2003 | Lortz ..................... 709/203 |
| 5,924,080 A | 7/1999 | Naftzger | | 2003/0139969 A1 | 7/2003 | Scroggie et al. |
| 5,924,082 A | 7/1999 | Silverman et al. | | 2004/0243478 A1 | 12/2004 | Walker et al. |

FOREIGN PATENT DOCUMENTS

| | | |
|---|---|---|
| CA | 2217739 | 4/1996 |
| EP | 0 085 546 A2 | 8/1983 |
| EP | 0 512 509 A2 | 11/1992 |
| EP | 512413 | 11/1992 |
| EP | 0 779 587 A2 | 9/1996 |
| EP | 0 779 587 A3 | 9/1996 |
| EP | 0 817 138 A1 | 1/1998 |
| EP | 0 856 812 A2 | 5/1998 |
| EP | 0 862 150 A2 | 9/1998 |
| GB | 2 109 305 A | 6/1983 |
| GB | 2 265 032 A | 9/1993 |
| JP | 58132886 A | 8/1983 |
| JP | 2001093 A | 1/1990 |
| JP | 2208798 A | 8/1990 |
| JP | 4235700 A | 8/1992 |
| JP | 5242363 A | 9/1993 |
| JP | 6035946 | 2/1994 |
| JP | 7065218 A | 3/1995 |
| JP | 7078274 | 3/1995 |
| JP | 07098779 A | 4/1995 |
| JP | 07249176 | 9/1995 |
| JP | 7272012 | 10/1995 |
| JP | 8030848 A | 2/1996 |
| JP | 08137951 | 5/1996 |
| JP | 8-147545 | 6/1996 |
| JP | 8221484 | 8/1996 |
| JP | 8221645 A | 8/1996 |
| JP | 08329323 A | 12/1996 |
| JP | 09016836 A | 1/1997 |
| JP | 9062908 A | 3/1997 |
| JP | 9097288 | 4/1997 |
| JP | 9190479 A | 7/1997 |
| JP | 10187820 | 7/1998 |
| JP | 10214284 | 8/1998 |
| JP | 10240830 | 9/1998 |
| JP | 10269049 | 10/1998 |
| JP | 11088560 | 3/1999 |
| JP | 2003150769 | 5/2003 |
| KR | 9503826 B | 4/1995 |
| WO | WO 95/27242 | 10/1995 |
| WO | WO 96/32701 | 10/1996 |
| WO | WO 97/08638 | 3/1997 |
| WO | WO 97/16797 | 5/1997 |
| WO | WO 97/16897 | 5/1997 |
| WO | WO 97/20279 | 6/1997 |
| WO | WO 97/21200 | 6/1997 |
| WO | WO 97/23838 | 7/1997 |
| WO | WO 97/24701 | 7/1997 |
| WO | WO 97/25684 | 7/1997 |
| WO | WO 97/28510 | 8/1997 |
| WO | WO 97/35441 | 9/1997 |
| WO | WO 97/44749 | 11/1997 |
| WO | WO 97/50064 | 12/1997 |
| WO | WO 98/06050 | 2/1998 |
| WO | WO 98/15907 | 4/1998 |
| WO | WO 98/19260 | 5/1998 |
| WO | WO 98/21713 | 5/1998 |
| WO | WO 98/28699 | 7/1998 |
| WO | WO 98/48388 | 10/1998 |
| WO | WO 98/48563 | 10/1998 |
| WO | WO 98/49658 | 11/1998 |
| WO | WO 99/04326 | 1/1999 |
| WO | WO 99/07121 | 2/1999 |
| WO | WO 99/09508 | 2/1999 |
| WO | WO 99/38125 A1 | 7/1999 |
| WO | WO 97/28510 | 8/1999 |
| WO | WO 99/12117 A1 | 11/1999 |

OTHER PUBLICATIONS

Website: "Computer Science House: Projects: Drink Machine"; (http://www.csh.rit.edu/proj/drink.html); download date: Jan. 29, 1998; 2 pp.

Stigler, George J., "The Theory of Price", The Macmillan Company, Third Edition, Copyright 1966; pp. 82-94, 208-215, 15 pp.

"Chakravarthi Narasimhan", (http://www.olin.wustl.edu/faculty/narasimhan/); download date: Jul. 1, 1999; 2 pp.

"Pricing Strategy and Tactics", (http://www.Vanderbilt.edu/econ/reiley/ba250/outlines/21.html); download date: Jul. 1, 1999; 3 pp.

Odlyzko, Andrew, "The Bumpy Road of Electronic Commerce", (http://aace.Virginia.edu/aace/conf/webnet/html/ao.htm); download date: Jul. 1, 1999; 17 pp.

Website: DealTime.com: The Ultimate Online Shopping Service, (http.www.dealtime.com/about/aboutbodyhome.asp?B=dealtime&AID=0); download date: Oct. 20, 1999; 4 pp.

Website: "Frictionless Commerce Incorporated: Solutions", (http://www.frictionless.com/solutions.html. . . ); download date: Nov. 11, 1999; 2 pp.

Website: "United Buying Services", (http://www.inform.umd.edu/muc/clubinfo/ubs.html); download date: Apr. 15, 2003; 1pp.

"SaveSmart - How SaveSmart Works for Consumers"; (http://savesmart.com/consumer/consumer-howitworks.html), Copyright 1998, 7 pp.

"Welcome to Planet U, providers of U-pons - Internet Coupons - Internet Coupons"; (http://www.webcertificate.com:443/webcert/faq-detail.asp), Copyright 1998, 8 pp.

Webcertificate, the perfect gift-giving solution . . . It's quick! It's Easy! It's Secure!; (http://www.webcertificate.com:443/webcert/faq-detial.asp), Copyright 1998, 14 pp.

Shop the Marketplace, 1-800-flowers.com; (http://www.1800flowers.com/flowers/welcome.asp), Copyright 1998, 4 pp.

"The Leader in Internet Shopping Systems for Supermarkets and Drug Stores", groceries online. copyright 1996 Groceries Online, Inc. (http://www.groceries-online.com/), Copyright 1996, 4 pp.

"Brother Industries is pushing ahead with its new PC software . . . ", IDC Japan Report, Aug. 30, 1991, 1 pg.

Maras, Elliot, "1995: downsizing adds costs; new strategies sought", Automatic Merchandiser, Aug. 1996, 13 pp.

Naik, Gautam, "In Digital Dorm, Click on Return for Soda", The Wall Street Journal, Jan. 23, 1997, Section: Online, p. B1, 3 pp.

Shea, Barbara, "Read Fine Print When Comparing Car Rentals", Feb. 9, 1997, St. Louis Post-Dispatch, Section: Travel & Leisure, p. 04T, 2 pp.

Website: "CSH Drink Machine(s)", (http //www csh rit edu/proj/drink html), download date: Jan. 29, 1998, 2 pp.

Desjardins, Doug, "Hollywood's Investment in Online Video Retailer Gets Mixed Reviews", Video Store, Aug. 9, 1998, Section: p. 1, ISSN: 0195-1750, 3 pp.

Website: "FAQ: CSH Coke Machine Information", (http //www cs uu nl/wais/html/na-dir/csh-coke-machine-info html), May 5, 1994, 6 pp.

Stigler, George J., "The Theory of Price", The Macmillan Company, Copyright 1952, 14pp.

Bowman, Jr., Ward S., "Tying Arrangements and the Leverage Problem", The Yale Law Journal, Nov. 1957, vol. 67, No. 1, 10 pp.

Narasimhan, Chakravarthi, "A Price Discrimination Theory of Coupons", Marketing Science, Spring 1984, vol. 3, No. 2, 20 pp.

Judith Evans, "Who was that masked Cybershopper?; MasterCard-Visa Agreement on Credit Card security may make On-Line commerce fly", The Washington Post, View Related Topics; Feb. 2, 1996, Final Edition; Section: Financial; p. F01, 2 pp.

"First Virtual Holdings Releases Beta Software for Secure Transactions on Microsoft Merchant Server", PR Newswire, Mar. 31, 1997; Section: Financial News, 2 pp.

"Six vendors sign on for early electronic commerce venture", Phillips Business Information, Inc. Voice Technology News, Dec. 13, 1994; No. 25, vol. 6; ISSN: 1045-1498, 2 pp.

"The easy, pain-free way to buy or lease your next car", What is autoseek; (http://www.autoseek.com/#what) download date: May 28, 1997, 4 pp.

Nora Lockwood Tooher, "Macy's new gift card gets trial run in Warwick", The Providence Journal- Bulletin; Oct. 1, 1998; Section: Business; p. 1E, 2 pp.

Denise Caruso, "Digital Commerce; The boom in on-line shopping adds a twist to the old quandry of how to interstate purchases", The New York times, View Related Topics, Dec. 28, 1998; Late Edition—Final; Section: C; p. 3, col. 5; Business/Financial Desk, 3 pp.

Goodwine, Nadine, "New software way key lure in $17 million agency buyout.", Travel Weely, Nov. 26, 1984, Scetion: vol. 43, p. 45, ISSN: 0041-2082, 4pp.

"Woodside Management Systems Inc. today announced . . .", PR Newswire, Apr. 1, 1986, 2 pp.

Tellis, Gerard J., "Beyond the Many Faces of Price: An Integration of Pricing Strategies", Journal of Marketing, Oct. 1986, vol. 50, pp. 146-160, 15 pp.

Goodwin, Nadine, "Agency, funded by 3M, set to market software; Travelmation touts trip planner to corporations; designed to eliminate client-agent telephone calls; Business Travel Update", Travel Weekly, Oct. 13, 1986, Section: vol. 46, p. 45, ISSN: 0041-2082, 4pp.

Godwin, Nadine, "Agency dares to launch its own air res system; Travelmation system provides greater versatility, Automation Report", Travel Weekly, Oct. 23, 1986, 5 pp.

"Thomas Cook Travel U.S.A. has announced . . .", PR Newswire, Jan. 12, 1987, 2 pp.

Bawa, Kapil et al., "The Coupon-Prone Consumer: some Findings Based on Purchase Behavior Across Product Classes", Journal of Marketing, Oct. 1987, vol. 51, pp. 99-110, 12 pp.

Nomani Sr., A., "Air Crashes Stir Signs of Anxiety in Travelers", Wall Street Journal, Aug. 1, 1989, Section 2, p. 1, col. 1, 2 pp.

Carlsen, Clifford, "From Airline Tickets to Human Organs, the Electronic Markets are Booming", San Francisco Business Times, Aug. 14, 1989, Section: vol. 3, No. 50, Section 1, p. 17, 2pp.

Kuttner, Robert, "Computers May Turn the World into One Big commodities Pit.", BusinessWeek, Sep. 11, 1989, Section: Economic Viewpoint, No. 3123, p. 17, 3 pp.

Golden, Fran, "AAL's Riga doubts Marketel's appeal to retailers", Travel Weekly, Nov. 13, 1989, Section: vol. 48, No. 91, p. 4, ISSN: 0041-2082, 2 pp.

Del Rosso, Laura, "Firm proposes ticket-bidding system; Marketel explores electronic auction of travel; Marketel International", Travel Weekly, Nov. 13, 1989, Section: No. 91, vol. 48, p. 1, ISSN: 0041-2082, 3 pp.

"Letters to BusinessExtra", The San Francisco Chronicle, Dec. 26, 1989, Section: Business, C7, 3 pp.

Wallace, David, "Company Planning to Let Flyers bid on Airfares", Philadelphia Business Journal, Mar. 26, 1990, Section: vol. 9, No. 3, Section 1, p. 15, 3 pp.

Greenberg, Peter S., "The Savvy Traveler: Lower Air Fares for Consumers Not in the Cards . . ." Los Angeles Times, Jul. 8, 1990, Section: Travel, Part L, p. 2, col. 1, Travel Peak, 2 pp.

Carey, Christopher, "Firm Offers Auction for Airline Tickets", St. Louis Post-Dispatch, Aug. 7, 1991, Section: Business, p. 1B, 2 pp.

Pelline, Jeff, "Travelers Bidding on Airline Tickets SF firm offers chance for cut-rate fares", The San Francisco Chronicle, Aug. 19, 1991, Section: News, p. A4, 4 pp.

Upton, Kim, "News and Briefs: French Say Monoliths Off-Limits to Visitors", Los Angeles Times, Aug. 25, 1991, Section: Travel, Part L, p. 4, col. 1, Travel Desk, 2 pp.

"Buy Low, Fly High", USA Today, Nov. 14, 1991, Section: Bonus, p. 15, 2 pp.

Feldman, Joan M., "To rein in those CRSs; computer reservation systems" Air Transport World, Dec. 1991, Section: vol. 28, No. 12, p. 89, ISSN: 0002-2543, 5 pp.

"Traveler's Notes; Bookit Report", Consumers Reports Travel Letter, Dec. 1991, Section: vol. 7, No. 12, p. 143, 1 pg.

"CRTL's Blue Ribbon Deals for 1992", Consumer Reports Travel Letter, Jan. 1992, Section: vol. 8, No. 1, pp. 3-5, 2 pp.

"Newsletters", The Atlanta Journal and Constitution, Mar. 1, 1992, Section: Travel: Section K, p. 13, 1 pg.

Del Rosso, Laura, "Ticket-bidding firm closes its doors, Marketel International", Travel Weekly, Mar. 12, 1992, Section: vol. 51, No. 21, p. 1, ISSN: 0041-2082, 2 pp.

Hainer, Cathy et al., "Where vacationing kids get good care", USA Today, Apr. 1, 1992, Section: Life, p. 4D, 2 pp.

Weatherford, Lawrence R. and Bodily, Samuel E., "A Taxonomy and Research Overview of Perishable-Asset Revenue Management: Yield Management, Overbooking, and Pricing", Operations Research, Sep.-Oct. 1992, vol. 40, No. 5, pp. 831-844, 14 pp.

Spencer, Milton H. and Amos, Jr., Orley M., "Contemporary Economics, Eight Edition", Worth Publishers, Copyright 1993, 5 pp.

Rajendran, K.N. and Tellis, Gerard J., "Contextual and Temporal Components of Reference Price", Journal of Marketing, Jan. 1994, 13 pp.

Feldman, Joan M., "Reclaiming control; new software to close gap between projected and actual revenues", Aug. 1995, Section: vol. 32, No. 8, p. 35, ISSN: 0002-2543, 5 pp.

*United Sates v. Eastman Kodak Co.*, United States Court of Appeals for the Second Circuit, Docket No. 97-6190, decided Aug. 4, 1995, 16 pp.

Bronnenberg, Bart J., "Limited Choice Sets, Local Price Response, and Implied Measures of Price Competition", Journal of Marketing Research, 1 pg.

Prentice, Michael, "Searching for the lowest fare: Getting the lowest fare takes work, but it's worth the effort", The Ottawa Citizen, Oct. 9, 1996, Section: Citylife; Consuming Passion, p. C3, 3 pp.

"Auctioning unsold airline tickets", Insight (USA), download date: Oct. 29, 1996, 1 pg.

"Web Ventures presents Bookit!", (http www webventures com/ bookit), Copyright 1996, 1 pg.

"Salomon Brother's Maldutis Says Internet is Aviation's 'Third Revolution;' Will Earn Billions", World Airline News, Mar. 21, 1997, Section: vol. 7, No. 12, 2 pp.

Feldman, Joan M., "Pricing and cybersales; Internet airline ticket sales and reservations", Feb. 1998, Section: No. 2, vol. 35, p. 64, ISSN: 0002-2543, 4 pp.

Adyanthaya, Surain, "Revenue Management: the Black Art." Interavia Business & Technology, Sep. 1998, Section: No. 623, vol. 53, p. 43, ISSN: 0983-1592, 4 pp.

"Airfare Bargains on the Net: About E-mail Lists", (http //travel epicurious com/travel/c_planning/02_ airfares/email/intro html), Copyright 1998, 17 pp.

"Airtech - FlightPass Faq", (http //www airtech com/at_ flightpass/ at_ faqflightpass htm), download date: Oct. 5, 1998, 4 pp.

Woolley, Scott, "I got it cheaper than you", Forbes, Nov. 2, 1998, Section: Management, Strategies, Trends, 4pp.

Varian, Hal R., "First Monday: Differential Pricing and Efficiency", (http www firstmonday dk/issues/issue2/different/), Copyright 1996, 18 pp.

Kephart, Jeff, "Price Dynamics of Vertically; Introduction", (http //www research ibm com/infoecon . . . ), Aug. 15, 1998, 3 pp.

"Bookit Airfare Bidding System (Fax for Your Plane Ticket?)", Consumer Reports Travel Letter, Sep. 1991, Section: vol. 7, No. 9, pp. 97, 106, 3 pp.

Nelson, Janet, "Practical Traveler; Airlines Relaxing Policy On No-Refund Tickets", The New York Times, Sep. 22, 1991, Section 5, p. 3, col. 1, Travel Desk, 4 pp.

"Traveler's Notes; Easier Airfare Bidding.", Consumer Reports Travel Letter, Oct. 1991, Section: vol. 7, No. 10, p. 119, 1 pg.

Website: VendMaster, "Windows for Vending PRO with Inventory", (http //www vendmaster com/pro_ inv_ main html), download date: Jul. 16, 1998, 2 pp.

Website: Optimum Energy Group - Products, "VendingMi$er", (http //www optimumenergy com/products/miser html), download date: Aug. 12, 1998, 2 pp.

Burke, Raymond R., "Virtual Shopping: Breakthrough in Marketing Research", Harvard Business Review, Mar.-Apr. 1996, pp. 120-131, 9 pp.

Website: VendMaster, "Products; Windows for Vending", (http //www vendmaster com/products_main html), download date: Jul. 16, 1998, 2 pp.

PCT International Search Report for Application No. PCT/N095/ 00060, dated Oct. 10, 1995, 3 pp.

Brochure, "Introducing the Digital MenuBoard", Siren Technologies, Inc., (www sirentech com), 4 pp.

Rehayem, Gilbert, "Opinion: X-Press Betting", La Fleur's Lottery World, Feb. 7, 1997, 1 pg.

"Cape Town", Reuters Ltd, Nov. 8, 1979, PM Cycle, 1 pg.

"Save the mark", Financial Times (London), Feb. 1, 1983, Section I, Men & Matters at p. 12, 1 pg.

"POS spectrum: a lottery looks to POS for growth", UMI, Inc., POS News, Jan. 1989, vol. 5, No. 7, p. 8, ISSN: 0896-6230, Coden: Bhorad, 1 pg.

"Let's Play the Cash Register Receipts Lottery", The New York Times, Dec. 25, 1990, Section 1, p. 30, col. 4, Editorial Desk, 1 pg.

Schrage, Michael, "An Experiment In Economic Theory; Labs Testing Real Markets", The Record, Nov. 26, 1989, Section: Business at p. B01, 1 pg.
Nakayama, Atsushi, "Coca-Cola machines to be 'smarter'; the Teleterminal control system is aimed at keeping customers, and machines, satisfied", The Japan Economic Journal, Feb. 23, 1991, Section: Industry: Chemicals, 2 pp.
Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082, 3 pp.
"Philips offers customers financing through Citicorp; Philips Medical Systems North America, Citicorp North America Inc." Health Industry Today, Jun. 1991, Section: vol. 54, No. 6, p. 4, ISSN: 0745-4678, 1 pg.
"Coupons get serious; supermarkets use barcodes to prevent misredemptions", Chain Store Age Executive with Shopping Center Age, Oct. 1992, Section: vol. 68, No. 10, p. 68, ISSN: 0193-1199, 2 pp.
"Winn-Dixie/The Salvation Army Report Contributions For War Against Hunger", PR Newswire, Jun. 10, 1993, Section: Financial News, 1 pg.
Jones, Jeanne, "Data Readers Streamline Management; Scanner Technology Aids Retailers As Well As Plants, Wholesalers", The Houston Post, Jun. 26, 1994, Section: Business at p. Dl, 4 pp.
Fiorini, Phillip, "'No Place for Penny?'/Smallest coin doesn't make cents to some", USA Today, Jul. 29, 1994, Section: News at p. 1A, 3 pp.
Smith, Alison, "Survey of UK Consumer Credit and Asset Finance", Financial Times, Nov. 3, 1994, 3 pp.
Andreoli, Tom et al., "Cash Machines Offer A Whole Lotto Money For Withdrawl; An Unfortunate Juxtaposition; Block That Metaphor!; Something Street Talk; Fishy In Springfiled; State Street Sears?; Champion As Underdog; A 'Whole Language' Graduate", Crain's Chicago Business, Jun. 19, 1995, 2 pp.
"Spain: BBV launches new card", Cards International, Jun. 22, 1995, 1 pg.
Greene, Jan, "Farm bills please assns; National Grocers Association", Supermarket News, vol. 35, Dec. 23, 1985, 1 pg.
Knippenberg, Jim, "Will local radio empires strike back?", The Cincinnati Enquirer, Jul. 23, 1995, Section: Tempo at p. F01, 1 pg.
Brochure, "Cyber Bid", Net Fun Ltd., Copyright 1996, 9 pp.
Maras, Elliot, "Software opens doors to scientific machine menuing", Automatic Merchandiser, Feb. 1996, p. 36, ISSN: 0002-7545, 5 pp.
Hadley, Kimberly, "Pastors praying anti-arson effort will bum bias", The Nashville Banner, Jul. 26, 1996, Section: News at p. A13, 1 pg.
Gapper, John, "NatWest reports rise in bad debt", Financial Times, Jul. 31, 1996, Section: News: UK, 1 pg.
"Lynx Technology: Lynx to provide business leasing programme through Schroder Leasing", M2 Presswire, Aug. 9, 1996, 2pp.
Brochure, "For the Crew & the Customer: The Best Drive-Thru & Grill Service", Olivetti North America, Winter 1998, 2 pp.
"VendMaster: Windows and Vending Software, Reports", (http //www vendmaster com/reports_main html), download date: Feb. 6, 1998, 12 pp.
Taylor, Paul, "Towards a dream market", Financial Times (London), Sep. 4, 1996, Section: Survey - FT IT, 2 pp.
Singletary, Michelle, "Electronic World, Unchecked Problem? U.S. Move to Paperless Payments Raises Worries About Those Who Don't Use Banks", The Washington Post, Mar. 4, 1997, Section: Financial, 4 pp.
Hirschfeld, David, "Increasing Profits Through Automation", Independent Vendors Association Quarterly, Apr./May/Jun. 1997, 10 pp.
"Avco Financial Services", National Home Furnishing Association, (http //www homefurnish comNHFA/avco htm), download date: May 23, 1997, 2 pp.
Website, "Catalina Marketing Corporation", (http //catalinamktg com/prodcdir htm), Copyright 1997, 16 pp.
Riordan, Teresa, "Patents; A novel approach to making a better spermicide harks back to some old-fashioned methods", The New York Times, Jun. 9, 1997, Section D, p. 2, col. 1, Business/Financial Desk, 3 pp.

Nairn, Geoff, "The key to your identity: Falling costs will allow fingerprint verification to be widely used, reports Geoff Nairn", Financial Times (London), Jul. 15, 1997, Section: Technology; at p. 12, 3 pp.
"The United Computer Exchange, How It All Works", (http //www uce com/howitworks html), Copyright 1995-1997, 6 pp.
"Classified 2000: The Internet Classifieds", Classifieds2000, Inc., (http //www classifieds2000 com/cgi-cls/Display exe?C2K+aboutus), Copyright 1996-1997, 3 pp.
"General trading information and terms provided by tradingfloor. com", (http //www tradingfloor com/info htm), Oct. 22, 1996, 11 pp.
"NASDAQ", Information Sheet, (http //home axford com/corfin/ corf11 htm), download date: Aug. 15, 1997, 3 pp.
Gilbert, Allan Z., "Operators can gain with creative merchandising", Automatic Merchandiser, Oct. 1992, p. 80, ISSN: 1061-1797, 3 pp.
"Public Internet Kiosks, Inc. Receives First Order for Its 'Internet Station' - The Vending Machine of the Future", PR Newswire, Sep. 16, 1996, 2pp.
French, Simone A. et al., "A Pricing Strategy to Promote Low-Fat Snack Choices through Vending Machines", American Journal of Public Health, May 1997, vol. 87, No. 5, 3 pp.
PCT International Search Report for Application No. PCT/US98/ 21216, dated May 4, 1999, 4 pp.
Office Action for U.S. Appl. No. 09/348,566, mailed Oct. 1, 2003, 3 pp.
Anthony Joseph, "Baby the engine, and other saving tips", The Christian Science Monitor, Nov. 4, 1986, 3pp.
"Coupons & more", welcome to coolsavings.com - Copyright 1996-1999.(http://208,134.230.42/cgi-win/tempprs.exe/first.htm), 3 pp.
"A personal shopping organizer for the web savvy consumer. My KillerApp offers a personalized shopping experience to meet the unique needs of every individual user". (http://www.killerapp.com/ html/main/pr0004.html), Oct. 2, 1998, 2 pp.
"New Wave Marketing", Promotion Times, An SCA Quarterly Newsletter - First Quarter, undated, 2 pp.
Brochure: "Reaching In New Directions", First Data Corp., Merchant Services, undated, 31 pp.
Cook, Louise, "ConsumerWatch: Clip, Snip, Save", The Associated Press, Mar. 12, 1984, Business News Section, 2 pp.
"Global, Second-Generation, and Frequent-Buyer Set New Trends", Marketing News, Jun. 7, 1985, vol. 19, No. 12, p. 18, ISSN: 0025-3790, 1 pg.
Lacher, Lisa, "Coupon Gimmick Registers Profits", Business Dateline, Business Record, Dec. 7, 1987, vol. 83, No. 47, Section 1, 2 pp.
Stevens, Lawrence, "Hypermarket Challenge", Computerworld, Dec. 19, 1988, Section: Software & Services, 2 pp.
McIntyre, Faye, "Small businesses may prefer alternatives to advertising.", South Dakota Business Review, Jun. 1989, vol. 47, No. 4, p. 1(4), ISSN: 0038-3260, 4 pp.
"Safeway Introduces Store-Generated Coupons", PR Newswire, May 1, 1990, 1 pg.
Ramirez, Anthony, "The Pizza Version of Dialing '911'", The New York Times, Sep. 9, 1991, Late Edition - Final, Section D, p. 1, col. 3, Financial Desk, 4 pp.
Blattenberg, Robert C., "Interactive marketing: exploiting the age of addressability.", Sloan Management Review, Sep. 22, 1991, Section: vol. 33, No. 1, p. 5, ISSN: 0019-848X, 15 pp.
O'Kane, Gerry, "Parking your car by computer", South China Morning Post, Mar. 23, 1993, Section: Supplement, 3 pp.
McDowell, Bill, "Frequency marketing builds repeat business; Management", Information Access Company, a Thomson Corporation Company, Reed Publishing USA, Building Supply Home Centers, Aug. 1993, No. 2, vol. 165, p. 96, ISSN: 0890-9008, 5 pp.
Arend, Mark, "Debit frenzy? Not quite, but getting there", ABA Banking Journal, Apr. 1994, vol. 86, No. 4, pp. 57-61, ISSN: 0194-5947, 4 pp.
Rubel, Chad, "Young firm armed with technology fights an old giant; ETM to Ticketmaster: Let's rock", American Marketing Association, Marketing News TM, Jun. 19, 1995, 3 pp.
"Tecmark Reward Terminal", Tecmark Services, Inc., Copyright 1996, (http //www tecmarkinc com/terminal htm), 1 pg.

McKinney, Jeff, "Merchant program could pay off for Provident", The Cincinnati Enquirer, Mar. 24, 1996, Section: Financial at p. E02, 2 pp.

"Staples The Office Superstore to Participate in Visa 'Rewards for Your Home' Promotion; Savings will be offered to thousands of Visa Staples customers.", Business Wire, Mar. 25, 1996, p3251164, 2 pp.

Retailers in small N. D. town join forces (Discount Points Corp launches Discount Points, a multi-retailer consumer discount program), Tire Business, Apr. 29, 1996, vol. 14, No. 2, p. 10, 3 pp.

Wagner, Jim, "Cameras Tell Mall What Door You Use, How Often You Go", Albuquerque Tribune, Aug. 9, 1996, Section: Evening, 2 pp.

Fickenscher, Lisa, "Amex to Start Free Rewards Program with Discounts on Merchandise", The American Banker, Oct. 18, 1996, Section: Credit/Debit/ATMS at p. 10, 2 pp.

Fitzgerald, Kate, "Amex Program Moves Loyalty to Next Level: Custom Extras Finds A Medium Customers Can't Ignore: Billing Statements", Crain Communications Inc., Advertising Age, Nov. 4, 1996, Section: News, 2 pp.

"Click this box for extra pepperoni; CyberSlice routes online orders", The Dallas Morning News, Dec. 2, 1996, Section: Business, 2 pp.

Bonnici, Joseph et al., "Consumer issues in coupon usage: An exploratory analysis", Journal of Applied Business Research, Winter 1996/1997, vol. 13, No. 1, p. 31-40, ISSN: 0892-7626, Coden: JPBEBK, 12 pp.

"Frequent shopper programs are taking off.", Grocery Marketing, Jan. 1997, vol. 63, No. 1, p. 54, 2 pp.

Fickenscher, Lisa, "Merchant: American Express Seeks to Mine Its Data on Cardholder Spending Patterns", The American Banker, Mar. 24, 1997, Section: Credit/Debit/ATMS at p. 20, 2 pp.

"Dispensing the future", Lafferty Publications Limited, Electronic Payments International, May 1997, Section: Feature at p. 12, 4 pp.

"Grocery shopping goes on line in many markets; Technology spurs remote ordering concept", The Dallas Morning News, May 12, 1997, Section: Business at p. 2D, 2 pp.

"Industry Briefs", Phillips Business Information, Inc., Card News, Jun. 9, 1997, vol. 12, No. 11, 2 pp.

Popyk, Bob, "Turn customers into torchbearers", Information Access Company, a Thomson Corporation Company, National Trade Publications, Boating Industry, Sep. 1997, No. 9, vol. 60, p. 33, ISSN: 0006-5404, 3 pp.

Hoeschen, Brad, "Brookfield Square hopes mall card strikes a chord", The Business Journal of Milwaukee Inc., Business Dateline, Business Journal-Milwaukee, Sep. 12, 1997, vol. 14, No. 50 at p. 19, 2 pp.

"Acxiom Case-in-Point Case Study - Bloomingdale's Inc.", "Pushing Technology's Edge Upscale department store applies database for profit", (http //www acxiom com/cip-cs-b htm), download date: Sep. 23, 1997, 2 pp.

"NCR 7452 Workstation—Beyond Traditional POS", (http //www ncr com/product/retail/products/catalog/7452 shtml), download date: Sep. 23, 1997, 3 pp.

"From Our Family to Yours . . . 5 Weeks of Coupon Values for a Valuable Customer", Shoprite, Wakefern Food Corporation, Copyright 1998, 1 pg.

Heller, Al, "Chain Pharmacy: Forecast '98: New Technology Advances Pharmacy Productivity", Lebhar-Friedman Inc., Drug Store News, Jan. 12, 1998 at p. CP29, 4 pp.

"Advanced Mechanics Internet Specials", (http //www metroplexweb com/advcpn2 htm), download date: Mar. 12, 1998. 2 pp.

Website: "New Partners, more exciting rewards: The Membership Rewards program for 1998.", (http //www americanexpress com/rewards/news/docs/1998new_mr shtml), download date: Mar. 12, 1998, 38 pp.

Website: "U.P.C. Coupon Code Guidelines Manual", (http //www uc-council org/d31-3 htm), download date: Mar. 12, 1998, 10 pp.

Rubinstein, Ed, "Internet Continues to Fortify Takeout Sector For Operators", Lebhar-Friedman Inc., Nation's Restaurant News, Mar. 23, 1998 at p. 55, 5 pp.

Information Packet: "My Points® - Universal Rewards Currency", MotivationNet, Inc. Apr. 1998, 29 pp.

Hemsley, Steve, "Research and destroy; Point-of-purchase research provides brand managers . . . ", Centaur Communications Ltd., Marketing Week, Apr. 16, 1998, Section: Point of Purchase, 3 pp.

"WellsPark Group Lauches 'V.I.P. Rewards'; the Most Comprehensive Relationship Marketing Program Ever Created by a Mall Developer", Business Wire, Inc., May 19, 1998, 2 pp.

"Catching Red Light Runners", Business Communications Company, Advanced Transportation Technology News, Jun. 1998, vol. 5, No. 2, 2 pp.

Amato-McCoy, Deena, "Co-Branded Acme Credit Card Rewards Loyal Users", Information Access Company, A Thomson Corporation Company, Capital Cities Media Inc., Supermarket News, Jun. 15, 1998, p. 17, ISSN: 0039-5803, 2 pp.

"Acme Markets, U.S. Bancorp Debut visa Rewards Card", Phillips Business Information, Inc., Card News, Jun. 22, 1998, vol. 13, No. 12, 1 pg.

Rubinstein, Ed, "Technology: Prepaid program lets Galleria guests dine 'a la Card'", Nations's Restaurant News, (http //www nrn com), Jun. 29, 1998, 1 pg.

"DataCard Partners With CSI To Offer Card-Based Loyalty Solution To Merchants", Business Wire, Inc., Jul. 9, 1998, 1 pg.

Albright, Mark, "Grocery savings via Web coupons", Times Publishing Company, St. Petersburg Times, Jul. 22, 1998, Section: Business at p. 1E, 2 pp.

Campos, Frellie, "Discount shopping program extended to residents. ", Pacific Business News, Sep. 21, 1998, vol. 36, Issue 27, p. 32, 3/5p, ISSN: 0030-8552, 3 pp.

"Garage management needs", "Unit Tracking with The General Manager Professional", (http www dacobusy com/garage/idxgarg htm), download date: Mar. 16, 1999, 2 pp.

"Route Sales Automation - Track customers, orders, sales, and inventory! Route accounting,..", "Point of sale system carried in the palm of your hand", (http //www dacobusy com/), download date: Mar. 16, 1999, 1 pg.

"Alphatech, Inc., Looking To The Future", (http //www alphatech com/), download date: Mar. 25, 1999,1 pg.

"Alphatech: Technologies and Projects", (http //www alphatech com/secondary/techpro/compvis html), download date: Mar. 25, 1999, 1 pg.

"IMPS: Vehicle License Plate Recognition System", "IMPS ™ Integrated Multi-Pass System State of the Art Vehicle License Plate Recognition System", (http www singapore com/optasia/imps), download date: Mar. 25, 1999, 3 pp.

"MSTAR main", "Moving and Stationary Target Acquisition and Recognition (MSTAR)", (http www alphatech com/secondary/techpro/projects/mstar/MSTAR_TopLevel html), download date: Mar. 25, 1999,2 pp.

"Welcome to Q Lube!", (http //www qlube com/), download date: Mar. 25, 1999, 1 pg.

PCT Notification of Transmittal of the International Search Report or the Declaration for PCT/US99/22650, Dated Mar. 16, 2000, 1 pg.

PCT Notification of Transmittal of the International Search Report or the Declaration for PCT/US99/21720, Dated Mar. 23, 2000, 7 pp.

Website: "Pricing, The Professional Pricing Society Conference Agenda", (http //www pricing-advisor com/conf_agn htm), download date: Jun. 19, 1999, 9 pp.

Press Release, "Priceline.com Delivers Savings For Flexible Travelers in Side-By-Side Price Compairson", Priceline.com, Stamford, CT, May 28, 1999, 4 pp.

"Travel Industry Bellwether for All Commerce Players", Jupiter Communications, Copyright 1999, Jupiter Strategic Planning Services, 2 pp.

"Circuit City to Integrate E-Commerce with store shopping; retailer's E-superstore - www.circuitcity.com- to Open in July", PR Newswire, Jun. 15, 1999; Section: Financial News, 3 pp.

"Wal-Mart vs. Amazon: The fight begins"; Yahoo News, Jun. 9, 1999, 3 pp.

"Mercata - Group Buying Power", (http://www.mercata.com/cgi-bin/mercata/mercata/v1/pages./home.jsp), download date: Jun. 7, 1999, 5 pp.

David Lazarus, "E-Commerce, Japanese style", Wired online page, Jun. 7, 1999, 3 pp.

"Kmart expands inventory via in-store kiosks", Jun. 20, 1999, RT News; (www.retailtech.com), 1 pg.

"WebVoucher", (www.pinex.co.uk/webvoucher/), download date: Mar. 14, 1999, 2 pp.

Quinn, Jane Byrant, "New Cars for Less", Newsweek; Oct. 23, 1978; Section: The Columnists; p. 80, 2 pp.

"My Auto Broker—Online Auto Broker", (http://www.adverlink.com/myautobroker/), download date: May 28, 1997, 4 pp.

Hilts, Paul, "Technology meets commerce; electronic publishing; includes articles on the World Wide Web and the annual Military Book Show; ABA '96", Publisher's Weekly, vol. 243; No. 28; p. 43; ISSN: 0000-0019, 4 pp.

"About CyberSlice", (http://www.cyberslice.com/cgi-bin/WebObjects/CyberSlice:2@httpserv01/), download date: May 6, 1997, 2 pp.

"PriceWatch", (http://icon.co.za/-robo/prod01.htm), Jan. 14, 1997, 5 pp.

PCT International Search Report for Application No. PCT/US97/13588, dated Dec. 4, 1997, 3 pp.

PCT International Search Report for Application No. PCT/US00/13349, dated Nov. 9, 2000, 3 pp.

PCT International Preliminary Examination Report for Application No. PCT/US00/13349, dated Aug. 30, 2001, 7 pp.

Kohda, Youji, Endo, Susumu "Ubiquitous Advertising on the WWW: Merging Advertisement on the Broker", Computer Newtworks and SDN Systems 28, May 1, 1996 at pp. 1493-1499, 7 pp.

Conlon et al. "Press 1 for profit." Sales & Marketing Management. Sep. 1998, 6 pp.

Gilbert, Allan Z. A Call to Action For Wireless Data Communication, Automatic Merchandiser, Aug. 1996, 3 pp.

Coupon Acceptor, Beverage Industry, Dec. 1998, 1 pg.

Karlgaard, Rich Keep Your Eyes on the Prize, Forbes, Sep. 21, 1998, 3 pp.

Phillips Offers Customers Financing through Citicorp: Philips Medical Systems North America, Health Industry Today, Jun. 1991, 1 pg.

Jupiter Communications Online Intelligence, 1999 Jupiter Strategic Planning Services/DCS99-23, 2 pp.

"MAG" Vend Coupons Increase Profits, Conico, 1 pg.

Davis, Tim, Vend of the World, Beverage World, Dec. 1992, 2 pp.

Office Action for U.S. Appl. No. 09/221,099, mailed Dec. 18, 2000, 6 pp.

Office Action for U.S. Appl. No. 09/221,099, mailed Aug. 8, 2001, 6 pp.

Office Action for U.S. Appl. No. 09/221,099, mailed Mar. 8, 2002, 7 pp.

Office Action for U.S. Appl. No. 09/221,099, mailed Jan. 22, 2003, 7 pp.

Office Action for U.S. Appl. No. 09/221,099, mailed Jun. 1, 2004, 7 pp.

Office Action for U.S. Appl. No. 09/221,099, mailed Jun. 24, 2005, 4 pp.

Notice of Allowance for U.S. Appl. No. 09/221,099, mailed Sep. 6, 2006, 7 pp.

Notice of Allowance for U.S. Appl. No. 09/221,099, mailed Feb. 22, 2007, 7 pp.

Office Action for U.S. Appl. No. 09/345,092, mailed Mar. 20, 2001, 33 pp.

Final Office Action for U.S. Appl. No. 09/345,092, mailed Jan. 24, 2002, 37 pp.

Office Action for U.S. Appl. No. 09/345,092, mailed Oct. 22, 2002, 42 pp.

Office Action for U.S. Appl. No. 09/345,092, mailed Jul. 1, 2005, 17 pp.

Office Action for U.S. Appl. No. 09/345,092, mailed Aug. 29, 2006, 12 pp.

Notice of Allowance for U.S. Appl. No. 09/345,092, mailed Mar. 9, 2007, 6 pp.

Interview Summary for U.S. Appl. No. 09/345,092, mailed Jan. 26, 2007, 4 pp.

Office Action for U.S. Appl. No. 10/100,563, mailed Jun. 29, 2005, 7 pp.

Office Action for U.S. Appl. No. 10/100,563, mailed Mar. 15, 2006, 5 pp.

Office Action for U.S. Appl. No. 10/100,563, mailed Jul. 7, 2006, 6 pp.

Office Action for U.S. Appl. No. 10/100,563, mailed Sep. 27, 2006, 8 pp.

Interview Summary for U.S. Appl. No. 10/100,563, mailed Jan. 26, 2007, 4 pp.

Notice of Allowance for U.S. Appl. No. 10/100,563, mailed Apr. 25, 2007, 8 pp.

Notice of Allowance for U.S. Appl. No. 10/100,563, mailed Aug. 20, 2007, 6 pp.

Notice of Allowance for U.S. Appl. No. 11/461,259, mailed Jul. 9, 2010, 6 pp.

Notice of Allowance for U.S. Appl. No. 11/461,259, mailed Mar. 24, 2010, 6 pp.

Office Action for U.S. Appl. No. 11/461,259, mailed Aug. 5, 2009, 8 pp.

Office Action for U.S. Appl. No. 11/461,259, mailed Sep. 25, 2008, 8 pp.

* cited by examiner

| CUSTOMER IDENTIFIER 305 | CUSTOMER NAME 310 | CUSTOMER CONTACT INFORMATION 315 | CUSTOMER PAYMENT INFORMATION 320 |
|---|---|---|---|
| C-111 | SUSAN JONES | 123 MAIN ST. TOWN, USA | 1111-2222-3333-4444 |
| C-112 | TOM SMITH | TSMITH@ISP.NET | 2222-4444-6666-8888 |
| C-113 | DEAN GREENE | (111) 555-2222 | 3333-6666-9999-1111 |

FIG. 3

| PRODUCT IDENTIFIER 405 | PRODUCT DESCRIPTION 410 | APPLICABLE REBATE 1 415 | APPLICABLE REBATE N 420 |
|---|---|---|---|
| P-0010 | 8 OZ. "BRAND A" TOOTHPASTE | $0.30 | $0.35 |
| P-0011 | 10 OZ. "BRAND B" TOOTHPASTE | $0.50 | $0.40 |
| P-0053 | "BRAND Y" FROZEN ORANGE JUICE | $0.40 | $1.00 |
| P-0054 | "BRAND Y" FRESH ORANGE JUICE | $0.55 | $0.55 |
| P-0105 | "BRAND C" 6-PACK COLA | $0.45 | $0.45 |
| P-0106 | "BRAND P" 2L DIET COLA | $0.05 | $0.13 |

FIG. 4

| REQUESTED PRODUCT CATEGORY 505 | SUBSTITUTABLE PRODUCT IDENTIFIER 510 | MANUFACTURER PAYMENT PER DISPLAY OF PRODUCT 515 | MANUFACTURER PAYMENT PER CUSTOMER SUBSTITUTE OF PRODUCT 520 | SUBSTITUTION SUCCESS RATE 525 | EXPECTED REVENUE PER SUBSTITUTION 530 |
|---|---|---|---|---|---|
| BEVERAGE/ SOFT DRINK | P-0053 | $0.05 | $0.05 | 20% | $0.06 |
| BEVERAGE/ SOFT DRINK | P-0054 | $0.01 | $0.11 | 80% | $0.098 |

500

540 ↗ (arrow to row 1)
545 ↗ (arrow to row 2)

| ACQUISITION SESSION: AS-001 | | 605 |
|---|---|---|
| DATE AND TIME: 8/26/97, 11:14 AM | | 610 |
| RETAILER: RT-01 | | 615 |
| PRICING SESSION: PS-001 | | 620 |
| PRODUCTS ACQUIRED | QUANTITIES | |
| P-0554 | 1 | |
| P-0106 | 1 | |

METHOD AND APPARATUS FOR PRODUCT DISPLAY

CROSS-REFERENCE TO RELATED APPLICATIONS

The present application is a continuation of U.S. patent application Ser. No. 10/100,563, filed Mar. 15, 2002 now U.S. Pat. No. 7,340,419, entitled METHOD AND APPARATUS FOR PRODUCT DISPLAY; which claims the benefit of U.S. Provisional Patent Application No. 60/276,193, filed Mar. 15, 2001, entitled SYSTEMS AND METHODS FOR EFFECTUATING PROXIMATE PRODUCT PLACEMENT BASED ON PRODUCT SUBSTITUTABILITY.

Each of the above-referenced applications is incorporated by reference herein in its entirety.

This application is also related to the following U.S. patent applications:

U.S. patent application Ser. No. 10/100,684, entitled METHOD AND APPARATUS FOR PROMOTING A PRODUCT filed Mar. 15, 2002;

U.S. patent application Ser. No. 10/100,565 entitled PROCESS AND PRODUCT FOR PROMOTING A PRODUCT, filed Mar. 15, 2002;

U.S. patent application Ser. No. 10/100,564 entitled PROCESS AND PRODUCT FOR ENFORCING PURCHASE AGREEMENTS, filed Mar. 15, 2002 and issued as U.S. Pat. No. 6,805,290 on Oct. 19, 2004;

U.S. patent application Ser. No. 09/609,598, entitled SYSTEMS AND METHODS WHEREIN A BUYER PURCHASES PRODUCTS IN A PLURALITY OF PRODUCT CATEGORIES, filed Jun. 29, 2000 and issued as U.S. Pat. No. 7,188,080 on Mar. 6, 2007;

U.S. patent application Ser. No. 08/889,503, entitled SYSTEMS AND METHODS WHEREIN A BUYER PURCHASES A PRODUCT AT A FIRST PRICE AND ACQUIRES THE PRODUCT FROM A MERCHANT THAT OFFERS THE PRODUCT FOR SALE AT A SECOND PRICE, filed Jul. 8, 1997 and issued as U.S. Pat. No. 6,249,772 on Jun. 19, 2001;

U.S. patent application Ser. No. 09/591,594, entitled SYSTEMS AND METHODS WHEREIN A BUYER PURCHASES A PRODUCT AT A FIRST PRICE AND PHYSICALLY ACQUIRES THE PRODUCT AT A LOCATION ASSOCIATED WITH A MERCHANT THAT OFFERS THE PRODUCT FOR SALE AT A SECOND PRICE, filed Jun. 29, 2000 and issued as U.S. Pat. No. 7,107,228 on Sep. 12, 2006;

U.S. patent application Ser. No. 09/348,566, entitled SETTLEMENT SYSTEMS AND METHODS WHEREIN A BUYER TAKES POSSESSION AT A RETAILER OF A PRODUCT PURCHASED USING A COMMUNICATION NETWORK, filed Jul. 7, 1999 and issued as U.S. Pat. No. 7,039,603 on May 2, 2006;

U.S. patent application Ser. No. 09/388,723, entitled REDEMPTION SYSTEMS AND METHODS WHEREIN A BUYER TAKES POSSESSION AT A RETAILER OF A PRODUCT PURCHASED USING A COMMUNICATION NETWORK, filed Sep. 2, 1999 and now abandoned;

U.S. patent application Ser. No. 09/337,906, entitled PURCHASING SYSTEMS AND METHODS WHEREIN A BUYER TAKES POSSESSION AT A RETAILER OF A PRODUCT PURCHASED USING A COMMUNICATION NETWORK, filed Jun. 22, 1999 and issued as U.S. Pat. No. 6,754,638 on Jun. 22, 2004;

U.S. patent application Ser. No. 09/370,291, entitled SUPPLEMENTAL OFFERS WHEREIN A BUYER TAKES POSSESSION AT A RETAILER OF A PRIMARY PRODUCT PURCHASED THROUGH A PURCHASING SYSTEM, filed Aug. 9, 1999 and now abandoned;

U.S. patent application Ser. No. 09/412,930, entitled METHODS AND APPARATUS WHEREIN A BUYER ARRANGES TO PURCHASE A FIRST PRODUCT USING A COMMUNICATION NETWORK AND SUBSEQUENTLY TAKES POSSESSION OF A SUBSTITUTE PRODUCT AT A RETAILER, filed Oct. 5, 1999 and issued as U.S. Pat. No. 6,970,837 on Nov. 29, 2005; and U.S. patent application Ser. No. 09/540,035, entitled RETAIL SYSTEM FOR SELLING PRODUCTS BASED ON A FLEXIBLE PRODUCT DESCRIPTION, filed Mar. 31, 2000.

The content of each of the above is incorporated by reference herein for all purposes.

BACKGROUND OF THE INVENTION

Customers may be influenced to or prompted to make certain purchases based on the viewing of a product, even if that customer did not intend a priori to purchase that product, or did not intend to purchase that particular brand of the product. For example, products that are displayed at the ends of aisles in supermarkets are typically subject to increased retail traffic. Accordingly, such products generally receive higher sales. However, not all products can be displayed in such a manner, due to, e.g., space limitations.

BRIEF DESCRIPTION OF THE DRAWINGS

FIG. 3 is a table illustrating an exemplary data structure of a customer database;

FIG. 4 is a table illustrating an exemplary data structure of a product database;

FIG. 5 is a table illustrating an exemplary data structure of a product slotting database;

FIG. 6 is a table illustrating an exemplary data structure of an actual transaction database;

DETAILED DESCRIPTION OF THE INVENTION

Figure 1A:
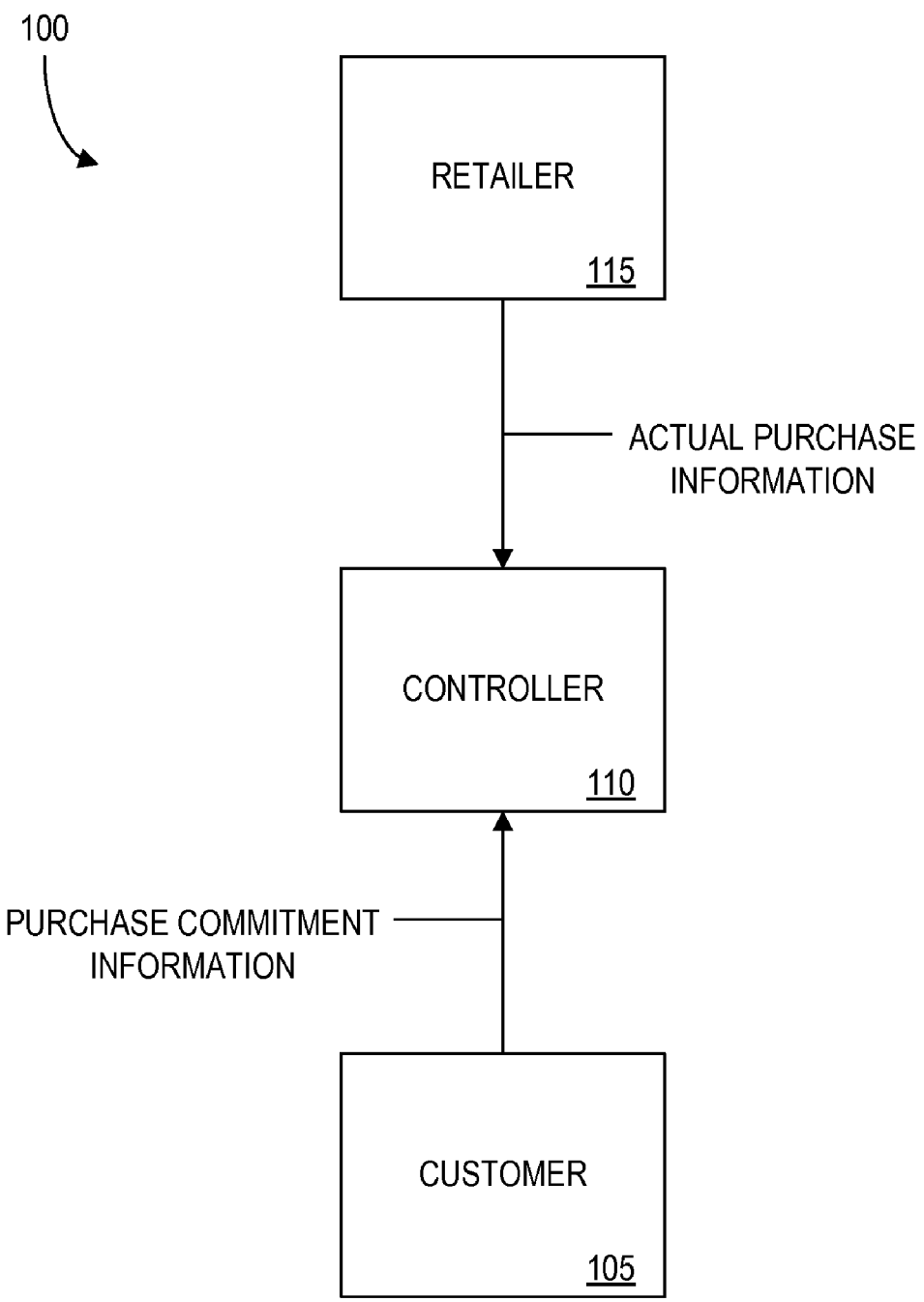
FIG. 1A is a block diagram of an embodiment of a system consistent with the present invention.

Applicants have recognized that, in some situations, it can be advantageous to display products to customers who may be willing to purchase those products.

Applicants have also recognized that, in some situations, it can be advantageous to display products to customers in exchange for money received from a seller of that product, such as a manufacturer or wholesaler.

Methods and systems for slotting products into categories based on substitutability of the related products and revenue management techniques are disclosed. For example, in accordance with an embodiment of the invention, a customer may indicate to the system that the customer is interested in purchasing in a general category (e.g. soft drinks). Such a customer may not have a specific brand in mind and may be willing to purchase from a number of different brands.

"Slots" in the soft drink category may be sold, even slots for products that are not typically included in the soft drink category. For example, bottled water may be slotted next to typical carbonated soft drink beverages. The substitute products could be slotted into substitution slots while the customer is assembling their basket or in substitution slots that appear at the time of checkout.

The system may determine which substitute products to slot using a rules based system. One possible factor affecting selection of the substitute product to display is how much the manufacturer would pay to place their product in the substitute slot. The manufacturer may pay every time their product is displayed and/or every time a customer selects their product from the substitute slot. It would be advantageous to place the product from the manufacturer who is willing to pay the system the most for that slot.

The system must also take into consideration how often the customer selects the product since the manufacturer may be willing to pay every time the customer purchases their product when it is in the substitution slot. For example, if an expected rate of substitution is determinable, the expected revenue from substitution may be determined. Consequently, the expected revenue from slotting particular products may be determined.

The disclosed systems and methods may benefit manufacturers by allowing them to build an expanded customer base, by drawing customers from a broader range of comparable products. The disclosed systems and methods may also benefit retailers and others that partner with manufacturers to sell products as described herein.

According to an embodiment of the present invention, a product may be priced by way of receiving, from a customer, information defining one or more group(s) of comparable products the consumer is willing to purchase from, the information further including a price the customer is willing to pay. The buyer-defined price may be provided in exchange for individual products from within the group, or for the group itself.

For example, the on-line pricing system may transmit a redemption code to the customer device, entitling the customer to take delivery of one or more product(s) from a retailer local to the customer.

Upon taking delivery of the previously priced product(s), the customer device may communicate information related to the product(s) (e.g. one or more product identifier(s)) to the applicable retailer system. According to some embodiments of the present invention, rather than providing information related to the specific products having been taken delivery of, the customer or customer device may simply provide the previously received redemption code to the retailer system. A detailed discussion of manners in which a redemption code may be assigned, issued and redeemed, as well as other methods related to the process of establishing a price for products and then acquiring products from a retailer, is provided in the following:

U.S. patent application Ser. No. 09/609,598, entitled SYSTEMS AND METHODS WHEREIN A BUYER PURCHASES PRODUCTS IN A PLURALITY OF PRODUCT CATEGORIES, filed Jun. 29, 2000;

U.S. patent application Ser. No. 08/889,503, entitled SYSTEMS AND METHODS WHEREIN A BUYER PURCHASES A PRODUCT AT A FIRST PRICE AND ACQUIRES THE PRODUCT FROM A MERCHANT THAT OFFERS THE PRODUCT FOR SALE AT A SECOND PRICE, filed Jul. 8, 1997 and issued as U.S. Pat. No. 6,249,772 on Jun. 19, 2001;

U.S. patent application Ser. No. 09/591,594, entitled SYSTEMS AND METHODS WHEREIN A BUYER PURCHASES A PRODUCT AT A FIRST PRICE AND PHYSICALLY ACQUIRES THE PRODUCT AT A LOCATION ASSOCIATED WITH A MERCHANT THAT OFFERS THE PRODUCT FOR SALE AT A SECOND PRICE, filed Jun. 29, 2000 and issued as U.S. Pat. No. 7,107,228 on Sep. 12, 2006;

U.S. patent application Ser. No. 09/348,566, entitled SETTLEMENT SYSTEMS AND METHODS WHEREIN A BUYER TAKES POSSESSION AT A RETAILER OF A PRODUCT PURCHASED USING A COMMUNICATION NETWORK, filed Jul. 7, 1999 and issued as U.S. Pat. No. 7,039,603 on May 2, 2006;

U.S. patent application Ser. No. 09/388,723, entitled REDEMPTION SYSTEMS AND METHODS WHEREIN A BUYER TAKES POSSESSION AT A RETAILER OF A PRODUCT PURCHASED USING A COMMUNICATION NETWORK, filed Sep. 2, 1999 and now abandoned;

U.S. patent application Ser. No. 09/337,906, entitled PURCHASING SYSTEMS AND METHODS WHEREIN A BUYER TAKES POSSESSION AT A RETAILER OF A PRODUCT PURCHASED USING A COMMUNICATION NETWORK, filed Jun. 22, 1999 and issued as U.S. Pat. No. 6,754,636 on Jun. 22, 2004;

U.S. patent application Ser. No. 09/370,291, entitled SUPPLEMENTAL OFFERS WHEREIN A BUYER TAKES POSSESSION AT A RETAILER OF A PRIMARY PRODUCT PURCHASED THROUGH A PURCHASING SYSTEM, filed Aug. 9, 1999 and now abandoned;

U.S. patent application Ser. No. 09/412,930, entitled METHODS AND APPARATUS WHEREIN A BUYER ARRANGES TO PURCHASE A FIRST PRODUCT USING A COMMUNICATION NETWORK AND SUBSEQUENTLY TAKES POSSESSION OF A SUBSTITUTE PRODUCT AT A RETAILER, filed Oct. 5, 1999 and issued as U.S. Pat. No. 6,970,837 on Nov. 29, 2005; and U.S. patent application Ser. No. 09/540,035, entitled RETAIL SYSTEM FOR SELLING PRODUCTS BASED ON A FLEXIBLE PRODUCT DESCRIPTION, filed Mar. 31, 2000.

According to another embodiment of the invention, products may be priced by way of receiving, from a consumer, information defining one or more types or categories of comparable products the consumer is willing to purchase from.

These and other embodiments are described herein.

System

Referring now to FIG. 1, an apparatus 100 according to an embodiment of the present invention includes a controller 110 that is in communication with one or more retailers 115 via a network such as the Internet (wired and/or wirelessly), via another network protocol, or via other means for communication as would be understood by those of ordinary skill in the art. Although only one retailer 115 is depicted in FIG. 1A, any number of retailers may be in communication with the controller 110.

The controller 110 also communicates with a customer 105 via a network such as the Internet (wired and/or wirelessly), via another network protocol, or via other means for communication as would be understood by those of ordinary skill in the art. Although only one customer 105 is depicted in FIG. 1A, any number of customers may be in communication with the controller 110.

The customer 105 and/or retailer 115 may comprise computers, such as those based on the Intel® Pentium® processor, that are adapted to communicate with the controller 110.

Communication with the controller 110 may be direct or indirect. For example, communication may be via the Internet through a Web site maintained by controller 110 on a remote server or via an on-line data network including commercial on-line service providers, bulletin board systems and the like. In some embodiments, the customer 105 and retailer 115 may communicate with controller 110 over radio frequency ("RF"), infrared ("IR"), cable TV, satellite links and the like, including combinations thereof.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The controller 110 may function as a "Web server" that generates Web pages (documents on the Web that typically include an HTML file and associated graphics and script files) that may be accessed via the Web and allows communication with the controller 110 in a manner known in the art. Those of skill in the art will understand that there are a variety of well-known ways for creating and operating Web pages, and accordingly a detailed description of such known processes is omitted here for clarity.

Any or all of the customer 105, the controller 110 and retailer 115 may comprise, e.g., a conventional personal computer, a portable type of computer, such as a laptop computer, a palm-top computer, a hand-held computer, or a Personal Digital Assistant (PDA), or combinations thereof.

Figure 1B:
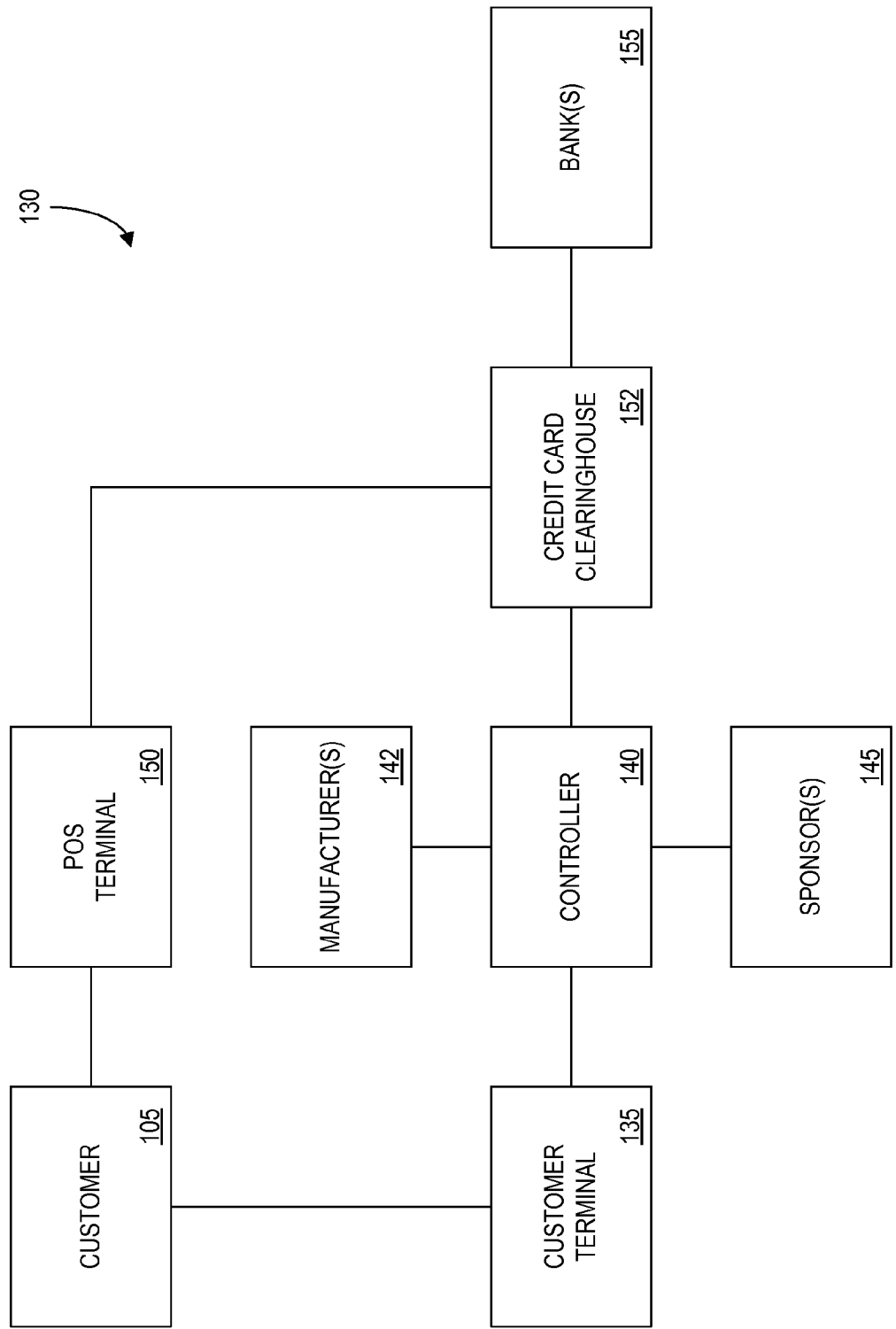
FIG. 1B is a block diagram of another embodiment of a system consistent with the present invention.

Referring to FIG. 1B, an apparatus 130 according to an embodiment of the present invention includes a controller 140 that is in communication with one or more customer terminals 135, one or more manufacturers 142, one or more sponsors 145, and one or more credit card clearing houses 152. Communication with each may be via a network such as the Internet (wired and/or wirelessly), via another network protocol, or via other means for communication as would be understood by those of ordinary skill in the art. It is also possible that controller 140 will receive information directly or indirectly from a POS terminal 150, such as a cash register (e.g., mechanical or electronic). The POS terminal may include a bar code scanner, keypad, and/or any other input device for receiving information related to one or more products being acquired. The POS terminal may also comprise or include means for receiving the previously assigned redemption code, along with information related to the specific products having been taken delivery of (e.g. coded information such as bar codes, SKUs or other product descriptor(s)).

A customer 105 communicates with the customer terminal 135, which may include a web browser or other known user interface means. The customer 105 also communicates with the POS terminal 150. In typical situations, the customer 105 will not communicate with the customer terminal 135 and the POS terminal 150 simultaneously.

As is known in the art, the credit card clearinghouse 152 communicates with one or more banks 155 as well as with the one or more POS terminals 150 to effectuate the processing of transactions made using a credit card account. For example, the credit card clearinghouse 152 may receive from the POS terminal a request to authorize a purchase for which a credit card account is to be charged for payment. The credit card clearinghouse 152 in turn responds to the request, typically to either authorize or deny the request. Via communication with the credit card clearinghouse 152, the controller 140 may likewise effectuate processing of credit card transactions via its communication with the credit card clearinghouse 152.

The manufacturers 142 can communicate with the controller 140 to, e.g., communicate desired prices, promotions and other product and pricing information to controller. It will be understood by those of ordinary skill in the art that, in addition to manufacturers, other product suppliers or sellers such as retailers, wholesalers and the like may communicate in a like manner with the controller 140.

The sponsors 145 include merchants willing to provide a benefit to the controller, manufacturer, customer, retailer and/or other parties in exchange for, e.g., advertising to the customer, acquisition of the customer as a client of the sponsor, other interaction with the customer.

Figure 1C:
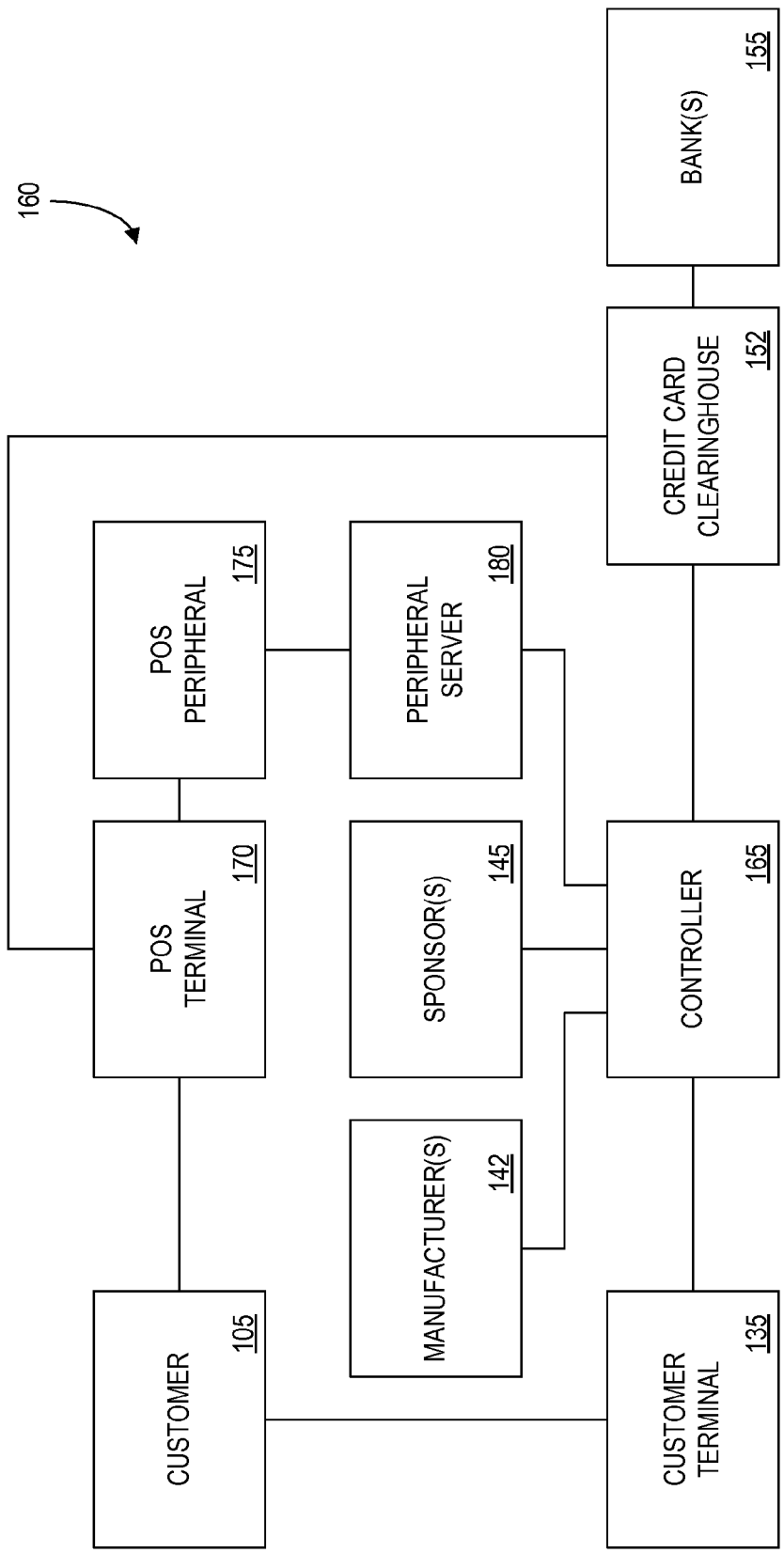
FIG. 1C is a block diagram of another embodiment of a system consistent with the present invention.

Referring to FIG. 1C, an apparatus 160 according to an embodiment of the present invention includes a controller 165 that is in communication with one or more customer terminals 135, one or more manufacturers 142, one or more sponsors 145, and one or more credit card clearing houses 152. Communication with each may be via a network such as the Internet (wired and/or wirelessly), via another network protocol, or via other means for communication as would be understood by those of ordinary skill in the art.

It is also possible that controller 165 will receive information directly or indirectly from a POS terminal 170, via a POS peripheral 175 and a peripheral server 180. The POS terminal 170 may be a cash register (e.g., mechanical or electronic). The POS peripheral 175 may be a device that receives information from the POS terminal 170, such as a coupon printer of the type manufactured by Catalina Marketing Corporation. The peripheral server 180 may be in communication with a plurality of such POS peripherals, thereby allowing the peripheral server 180 to receive information regarding a plurality of transactions at a plurality of retailers.

The POS peripheral 175 may be operable to access a database (e.g., of peripheral server 180) to issue custom coupons, offers, incentives and messages based upon the transaction. The peripheral server 180 may thus monitor shopper purchase history over time by associating purchase behavior with customer identifiers, such as loyalty card or check cashing card numbers. Further, this information may be analyzed, e.g., to identify those customers which a particular retailer should find most desirable. Based upon retailer objectives, the peripheral server 180 may direct the appropriate POS peripheral 175 to issue customized messages to specific shoppers that are relevant to their shopping behaviors.

Information received by the POS peripheral 175 from the POS terminal 170 may include transaction data such as products purchased, prices of products purchased, coupons redeemed, and time and date of transaction.

A customer 105 communicates with the customer terminal 135, which may include a web browser or other known user interface means. The customer 105 also communicates with the POS terminal 170. In typical situations, the customer 105 will not communicate with the customer terminal 135 and the POS terminal 150 simultaneously.

As is known in the art, the credit card clearinghouse 152 communicates with one or more banks 155 as well as with the one or more POS terminals 150 to effectuate the processing of transactions made using a credit card account. For example, the credit card clearinghouse 152 may receive from the POS terminal a request to authorize a purchase for which a credit card account is to be charged for payment. The credit card clearinghouse 152 in turn responds to the request, typically to either authorize or deny the request. Via communication with the credit card clearinghouse 152, the controller 165 may likewise effectuate processing of credit card transactions via its communication with the credit card clearinghouse 152.

The manufacturers 142 can communicate with the controller 165 to, e.g., communicate desired prices, promotions and other product and pricing information to controller. It will be understood by those of ordinary skill in the art that, in addition to manufacturers, other product suppliers or sellers such as retailers, wholesalers and the like may communicate in a like manner with the controller 165.

The sponsors 145 include merchants willing to provide a benefit to the controller, manufacturer, customer, retailer and/or other parties in exchange for, e.g., advertising to the customer, acquisition of the customer as a client of the sponsor, other interaction with the customer.

In addition to the description above, other means for the controller to receive information regarding a set of products for which a buyer price is established online, and a corresponding set of products picked up at the retailer.

Devices

Figure 2:
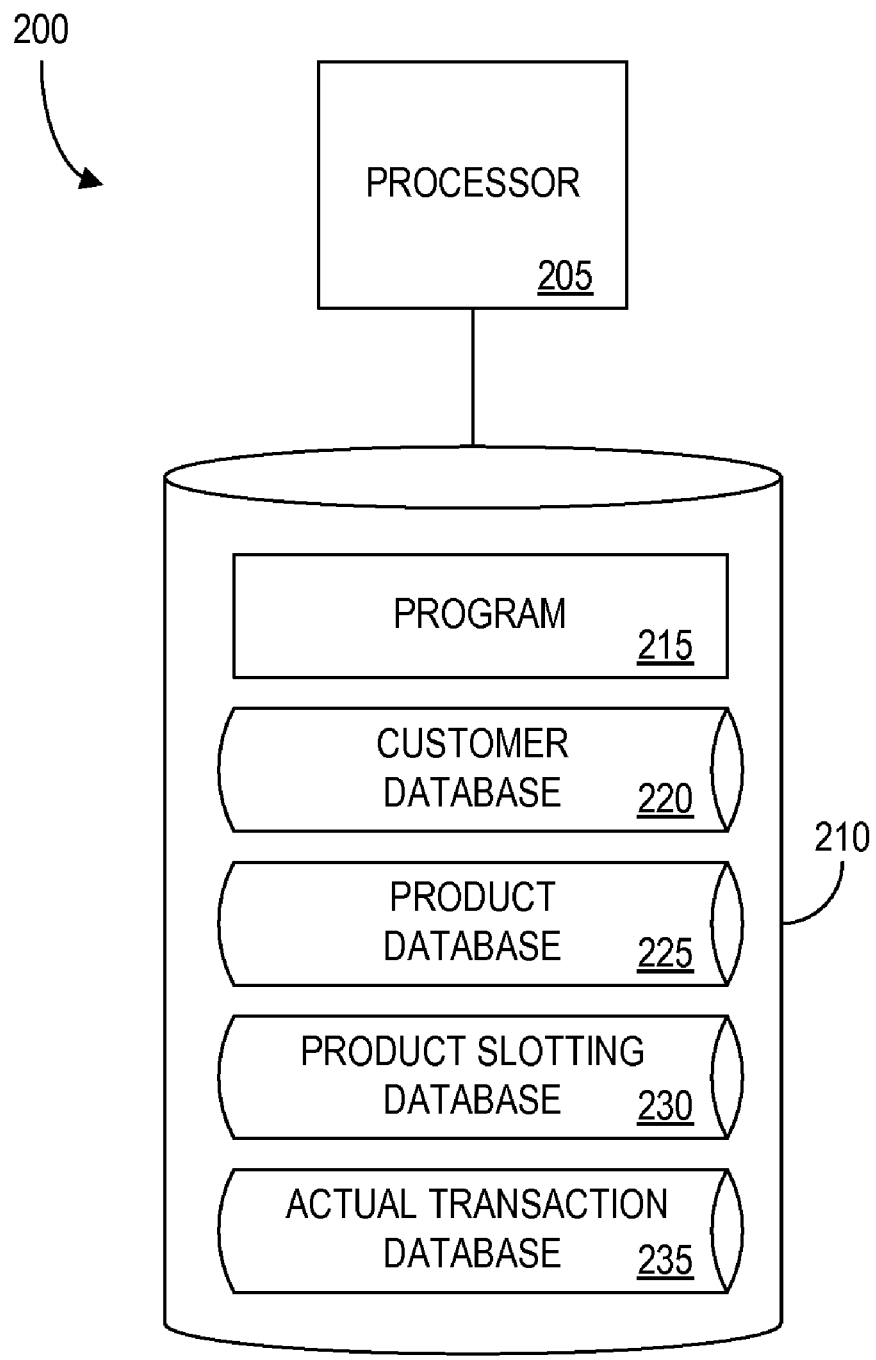
FIG. 2 is a block diagram of one embodiment of a controller.

FIG. 2 illustrates an embodiment 200 of a controller. The controller may be implemented as a system controller, a dedicated hardware circuit, an appropriately programmed general purpose computer, or any other equivalent electronic, mechanical or electromechanical device.

The controller 200 comprises a processor 205, such as one or more Intel® Pentium® processors. As is well known in the art, the processor 205 may be in communication with a communication port (not shown in FIG. 2) or other means for facilitating communication between the processor 205 and other devices.

The processor 205 is also in communication with a data storage device 210. The data storage device 210 comprises an appropriate combination of magnetic, optical and/or semiconductor memory, and may include, for example, Random Access Memory (RAM), Read-Only Memory (ROM), a compact disc and/or a hard disk. The processor 205 and the storage device 210 may each be, for example: (i) located entirely within a single computer or other computing device; or (ii) connected to each other by a remote communication medium, such as a serial port cable, telephone line or radio frequency transceiver or other wired or wireless media. In one embodiment, the controller may comprise one or more computers that are connected to a remote server computer for maintaining databases.

The data storage device 210 stores a program 215 for controlling the processor 205. The processor 205 performs instructions of the program 215, and thereby operates in accordance with the embodiments of the present invention, and particularly in accordance with the methods described in detail herein. The program 215 may be stored in a compressed, uncompiled and/or encrypted format. The program 215 furthermore includes program elements that may be necessary, such as an operating system, a database management system and "device drivers" for allowing the processor 205 to interface with computer peripheral devices. Appropriate program elements are well known to those of ordinary skill in the art, and need not be described in detail herein.

According to an embodiment of the present invention, the instructions of the program 215 may be read into a main memory from another computer-readable medium, such from a ROM to RAM. Execution of sequences of the instructions in program 215 causes processor 205 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The storage device 210 also stores (i) a customer database 220, (ii) a product database 225, (iii) a product slotting database 230, and (iv) an actual transaction database 235. The databases are described in detail below and depicted with exemplary entries in the accompanying figures. As will be understood by those skilled in the art, the schematic illustrations and accompanying descriptions of the databases presented herein are exemplary arrangements for stored representations of information. Many other arrangements may be employed besides those suggested by the tables shown. Similarly, the illustrated entries of the databases represent exemplary information only; those skilled in the art will understand that the number and content of the entries can be different from those illustrated herein.

Databases

FIG. 3 is a tabular representation of an embodiment 300 of the customer database. The tabular representation of the customer database includes a number of example records or entries, including the entry 330, each of which defines a customer. Those skilled in the art will understand that the customer database may include any number of entries. The tabular representation of customer database also defines fields for each of the entries or records. The fields specify: (i) a customer identifier 305 that uniquely identifies the customer; (ii) a customer name 310; (iii) contact information 315 of the customer; and (iv) payment information 320 of the customer, such as credit card or debit card account information which may be used to render payment on behalf of the customer.

The customer identifier, as well as other identifiers described herein, may be generated or assigned by the controller, or may be established by the customer and provided to the controller by way of a customer terminal or other appropriate device. For example, the customer identifier may comprise a numeric code that is assigned to the corresponding customer by the controller. Alternatively, the customer identifier may comprise a user name and/or password that may be generated by a customer terminal and subsequently provided to the controller.

The data stored in the contact information field may comprise any of (i) an electronic mail (e-mail) address, (ii) a postal address, (iii) telephone number, and (iv) a numeric IP address of the customer.

FIG. 4 is a tabular representation of an embodiment 400 of the product database. The tabular representation of the product database includes a number of example records or entries, including the entry 430, each of which defines a product offered for sale. Those skilled in the art will understand that the product database may include any number of entries, and that the information stored thereby may be specific to particular retailers. For example, the entry 430 may indicate a product offered for sale by, e.g., only a certain chain of stores, but not by others. Accordingly, the entries may optionally be associated with a retailer or set of retailers.

The tabular representation of product database also defines fields for each of the entries or records. The fields specify: (i) a product identifier 405 that uniquely identifies the product, such as an SKU or other appropriate identifier; (ii) a product description 410; and (iii) applicable rebates 415 and 420. Although two applicable rebates are illustrated in FIG. 4, any number of rebates may be used, and the number of rebates may differ among products in any manner desired.

FIG. 5 is a tabular representation of an embodiment 500 of the product slotting database. The tabular representation of the product slotting database includes a number of example records or entries, including the entries 540 and 545, each of which defines a substitute product, which may be displayed when a particular product category is requested to be displayed. Those skilled in the art will understand that the product slotting database may include any number of entries.

The tabular representation of product slotting database also defines fields for each of the entries or records. The fields specify: (i) a requested product category 505 that identifies the product or product category requested by the customer; (ii) an identifier 510 that identifies a substitute product to be displayed; (iii) a payment 515 which the manufacturer or other seller has agreed to pay upon display of the substitute product; (iv) a payment 520 which the manufacturer or other seller has agreed to pay upon sale to the customer of the substitute product; (v) a success rate 525 of such "substitution" of the substitute product for another (e.g., requested product or category); and (vi) an expected revenue 530 to be received per substitution, as determined by the expected revenue from the combination of display and substitution.

An expected revenue per substitution may be calculated according to the following equation:

$$ERS = \text{Manufacturer Payment per Display of Product} + (\text{Manufacturer Payment per Customer Substitute of Product}) * (\text{Substitution Success Rate})$$

FIG. 6 is a tabular representation of a record 600 of an embodiment of the actual transaction database. The actual transaction database would typically contain a plurality of such records, each such record defining an actual transaction of a customer with a retailer. The tabular representation of the record 600 includes a number of example records or entries, including the entries 625 and 630, each of which defines a product and corresponding quantity acquired during the transaction. Those skilled in the art will understand that the record may include any number of entries. The tabular representation of customer database also defines fields for each of the entries or records.

The record further specifies: (i) an acquisition session identifier 605 that uniquely identifies the actual transaction; (ii) a date and time 610 of the transaction; (iii) a retailer 615 with which the transaction occurred; and (iv) a pricing session 620 which indicates the proposed transaction that the actual transaction was purported to correspond to.

Process Description

Figure 7:
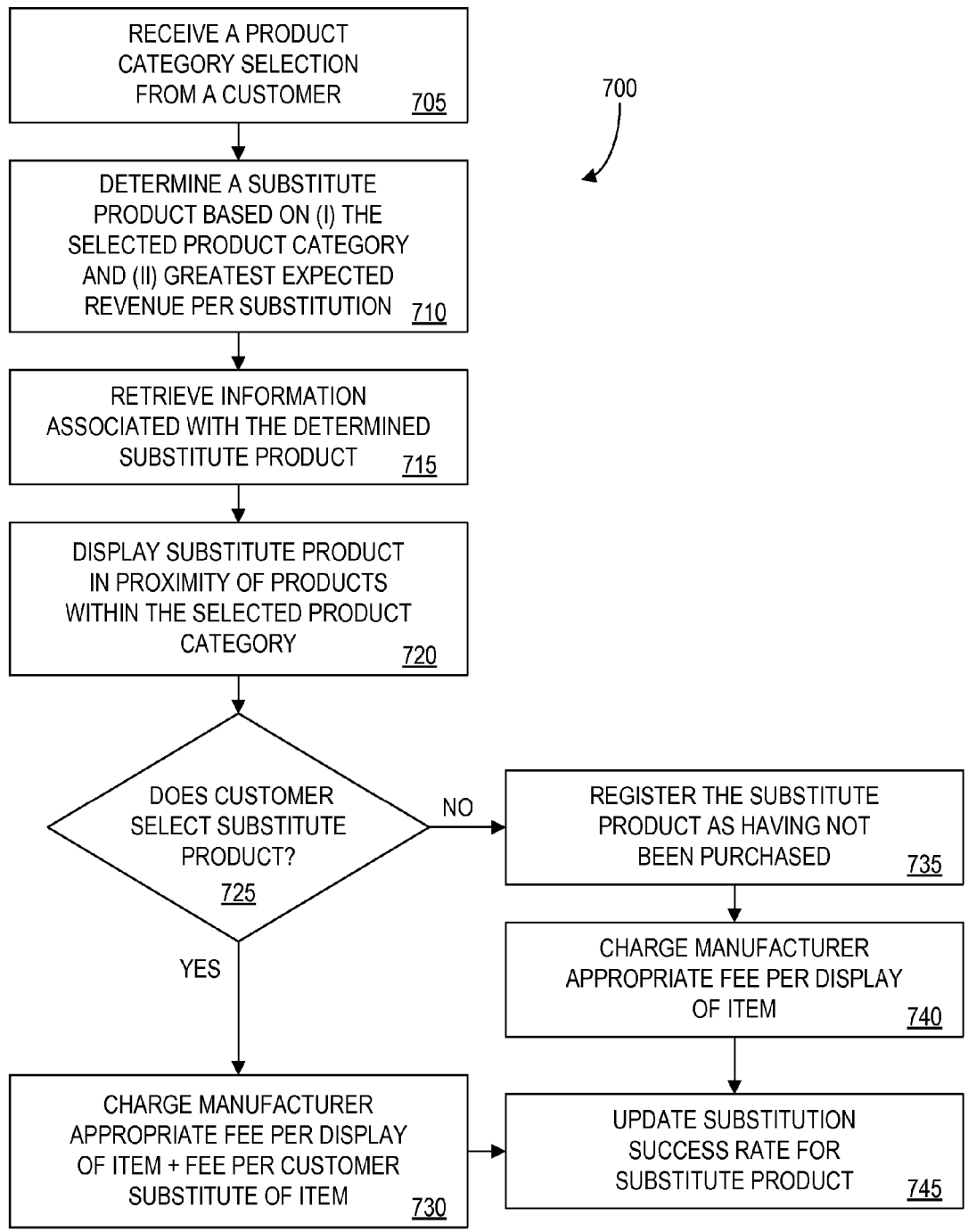
FIG. 7 is a flow diagram illustrating an exemplary process according to an embodiment of the present invention.

Referring to FIG. 7, a flow chart 700 represents an embodiment of the present invention that may be performed by the controller. The particular arrangement of elements in the flow chart of FIG. 7, as well as the other flow charts discussed herein, is not meant to imply a fixed order to the steps; embodiments of the present invention can be practiced in any order that is practicable.

At step 705, the controller receives a product category selection from a customer, typically via a Web browser at a customer terminal. For example, a customer may log on to the controller's Web Site and request to see products in the "Beverage/Soft Drink" category.

At step 710, the controller determines a substitute product based on (i) the selected product category and optionally (ii) the greatest expected revenue per substitution. For example, the controller may access the product database and product slotting database to determine, based on the requested product category and optionally the expected revenue per substitution, which product to display in the substitute product category. In the example above, the customer had requested the "Beverage/Soft Drink" category, so the controller system would determine from the product slotting database which products are appropriate substitutes for the "Beverage/Soft Drink" Category. The controller system would then determine the ERS for each of the products. The product with the greatest ERS may be the appropriate substitute product.

At step 715, the controller retrieves information associated with the determined substitute product. For example, the controller may access information including a product description, product identifier, product graphic, etc.

At step 720, the controller displays the determined substitute product in proximity of products within the selected product category. In one embodiment, the substitute product is displayed in a constant or substantially constant portion of a web page, such as in a particular frame, always to the left of a requested product category, etc.

At step 725, the controller determines whether the customer has selected the substitute product for purchase. If so, then at step 730 the controller charges, or registers an entry to later charge, the manufacturer for the appropriate fee per display of product plus the fee per customer substitute of product. Then, the controller at step 745 updates the substitution success rate for the substitute product. The substitution success rate is typically calculated as the number of times the substitute product is displayed in a product category divided by the number of times the substitute product is purchased in a product category. Other calculations of success rate may be used as desired.

If at step 725 the controller determines that the customer has not selected the substitute product for purchase, then at step 735 the controller registers the substitute product as having not been selected. At step 740 the controller charges the manufacturer the appropriate fee per display of product, and at step 745 updates the substitution success rate for the substitute product.

Although the present invention has been described with respect to a preferred embodiment thereof, those skilled in the art will note that various substitutions may be made to those embodiments described herein without departing from the spirit and scope of the present invention.

For example, the controller may dynamically determine which products are substitutes for one another based on customer preferences, manufacturer input, retailer input, retail prices, historical purchases, and other criteria.

In another embodiment, the substitution slots may appear while the customer is checking out (e.g. after the customer has assembled their shopping cart.) After the customer has assembled their shopping cart, the customer may be presented with an opportunity to switch an "original product" (in the shopping cart) for a substitute product. The customer may optionally receive a benefit for switching to the substitute product. Further, the customer may receive an offer (e.g., during checkout) prompting him to switch in exchange for a benefit.

The controller may determine which substitute products to offer the customer at check-out based on, e.g., the expected revenue described above.

What is claimed is:

1. A method comprising:
    receiving a request to display at least one product;
    selecting, by a controller from a plurality of substitute products for the product, a substitute product for the at least one product,
        in which each of a plurality of manufacturers has agreed to provide to the controller a respective payment in exchange for each display of a respective substitute product,
        in which selecting is based on the respective payment to be provided to the central controller in exchange for displaying the selected substitute product; and
    displaying the substitute product at a terminal.

2. The method of claim 1, further comprising:
displaying the at least one product.

3. The method of claim 2, further comprising:
displaying the substitute product adjacent to the at least one product.

4. The method of claim 1, further comprising:
receiving from a customer a selection of the substitute product; and
selling the substitute product to the customer.

5. The method of claim 1, further comprising:
providing an offer to s customer to switch from a product selected by the customer to the substitute product.

6. The method of claim 5, in which providing the offer is performed after the customer has indicated a willingness to complete a purchase transaction for the product selected by the customer.

7. The method of claim 1, further comprising:
calculating a substitution success rate; and
storing an indication of the substitution success rate.

8. The method of claim 1, further comprising:
receiving data indicating a substitute product and a product category for which the substitute product is to be displayed.

9. The method of claim 8, in which the data is received from a manufacturer of the substitute product.

10. The method of claim 1, in which displaying the substitute product comprises:
displaying the substitute product in a frame of a web browser.

11. The method of claim 10, in which the frame is located in a persistent location in a browser window.

12. A system comprising:
a controller comprising:
 a processor; and
 a computer readable medium in communication with the processor, the computer readable medium storing instructions configured to direct the processor to perform steps of:
  receiving an indication of a product category;
  determining, by a controller, a product based on the product category;
  selecting, by the controller from a plurality of substitute products, a substitute product for the determined product,
   in which each substitute product of the plurality of substitute products is associated with a respective payment that a respective manufacturer has agreed to pay in exchange for each display of the substitute product,
   in which selecting the substitute product is based on the respective payment; and
  transmitting a signal to display the selected substitute product at a terminal and
 the terminal in communication with the controller, the terminal comprising:
  a display operable to display an indication of the selected substitute product.

13. A method comprising:
receiving an indication of a product category;
determining, by a controller, a product based on the product category;
selecting, by the controller from a plurality of substitute products, a substitute product for the determined product,
 in which each substitute product of the plurality of substitute products is associated with a respective payment that a respective manufacturer has agreed to pay in exchange for each display of the substitute product,
 in which selecting the substitute product is based on the respective payment; and
transmitting a signal to display the selected substitute product.

14. The method of claim 13, in which transmitting a signal to display the selected substitute product comprises:
transmitting a signal to display the selected substitute product adjacent to the determined product.

15. The method of claim 13, further comprising:
transmitting a signal to display the determined product to the customer.

16. The method of claim 13, further comprising:
charging the respective manufacturer the respective payment in exchange for displaying the selected substitute product.

* * * * *